(12) United States Patent
Papantoniou

(10) Patent No.: US 12,097,978 B2
(45) Date of Patent: Sep. 24, 2024

(54) DOCKING STRUCTURE FOR SATELLITE DOCKING INCLUDING A PARALLEL MANIPULATOR WITH A TELESCOPIC CAPTURING PINCHER AND A PLURALITY OF MOTORIZED CLAMPS

(71) Applicant: Hellenic Technology of Robotics SA, Elafonisos Lakwnias (GR)

(72) Inventor: Vassilios Papantoniou, Kifisia (GR)

(73) Assignee: Hellenic Technologies of Robotics SA, Elafonisos Lakwnias (GR)

( * ) Notice: Subject to any disclaimer, the term of this patent is extended or adjusted under 35 U.S.C. 154(b) by 500 days.

(21) Appl. No.: 17/212,637

(22) Filed: Mar. 25, 2021

(65) Prior Publication Data
US 2021/0309397 A1    Oct. 7, 2021

(30) Foreign Application Priority Data
Apr. 6, 2020 (GR) .............................. 20100100176

(51) Int. Cl.
*B64G 1/64* (2006.01)
*B25J 9/12* (2006.01)
(Continued)

(52) U.S. Cl.
CPC .............. *B64G 1/646* (2013.01); *B25J 9/123* (2013.01); *B25J 13/085* (2013.01); *B64G 4/00* (2013.01);
(Continued)

(58) Field of Classification Search
CPC .... B64G 1/646; B64G 4/00; B64G 2004/005; B25J 9/123; B25J 13/085; G01L 5/0061; G01S 17/08
(Continued)

(56) References Cited

U.S. PATENT DOCUMENTS 4,177,964 A   12/1979  Hujsak et al.
4,219,171 A    8/1980  Rudmann
(Continued)

FOREIGN PATENT DOCUMENTS

CN    106 628 278 A    5/2017
CN    110 395 414 A   11/2019
(Continued)

OTHER PUBLICATIONS

European Search Report corresponding to 21 15 8895 mailed Jul. 30, 2021.
(Continued)

*Primary Examiner* — Brady W Frazier
(74) *Attorney, Agent, or Firm* — Finch & Maloney PLLC

(57) ABSTRACT

A service satellite having a body, a controller and a docking unit including a telescopic arm, mounted on a 6-DOF parallel manipulator, and two additional gripping arms. The telescopic arm, deployed from the 6-DOF manipulator, is equipped with a pair of rapid closure digits. The telescopic arm facilitates capturing the launch adaptor ring of a client spacecraft, even during tumbling. The 6-DOF parallel manipulator has force sensors and can accommodate post capturing relative motion through active compliance control and controlled de-tumbling, for avoiding generation of high forces in the telescopic arm. After relative rate annihilation, the telescopic arm retracts and the client ring is secured to the 6-DOF manipulator with the help of a pair of clamps. After the ring is secured, two additional gripping arms secure a rigid connection with the launcher ring so that the docking connection comprises three equally spaced connections.

5 Claims, 44 Drawing Sheets

(51) Int. Cl.
  *B25J 13/08* (2006.01)
  *B64G 4/00* (2006.01)
  *G01L 5/00* (2006.01)
  *G01S 17/08* (2006.01)
(52) U.S. Cl.
  CPC ............ *G01L 5/0061* (2013.01); *G01S 17/08* (2013.01); *B64G 2004/005* (2013.01)
(58) Field of Classification Search
  USPC ...................................................... 244/172.5
  See application file for complete search history.

(56) References Cited

U.S. PATENT DOCUMENTS

| | | |
|---|---|---|
| 4,260,187 A | 4/1981 | Bejczy |
| 4,588,150 A | 5/1986 | Bock et al. |
| 4,718,709 A | 1/1988 | Myers et al. |
| 4,858,857 A | 8/1989 | Lange et al. |
| 4,929,011 A | 5/1990 | Vandersluis et al. |
| 5,390,288 A | 2/1995 | Toda et al. |
| 5,511,748 A | 4/1996 | Scott |
| 6,354,540 B1 | 3/2002 | Lewis et al. |
| 6,523,784 B2 | 2/2003 | Steinsick et al. |
| 6,840,481 B1* | 1/2005 | Gurevich ............... B64G 1/646 244/172.4 |
| 6,945,500 B2 | 9/2005 | Wingo |
| 11,643,226 B1* | 5/2023 | Markcity ............... B64G 1/645 244/172.4 |
| 2004/0026571 A1* | 2/2004 | Scott ....................... B64G 1/24 244/172.5 |
| 2005/0103940 A1 | 5/2005 | Bischof et al. |
| 2015/0314893 A1* | 11/2015 | Rembala ............... B64G 1/222 244/172.4 |
| 2018/0148197 A1 | 5/2018 | Halsband et al. |
| 2019/0077524 A1* | 3/2019 | Faber .................... B64C 39/024 |
| 2020/0102102 A1 | 4/2020 | Liu et al. |
| 2021/0016438 A1* | 1/2021 | Pivac ....................... B25J 13/08 |
| 2021/0086923 A1* | 3/2021 | Halsband ................ B64G 1/42 |

FOREIGN PATENT DOCUMENTS

| | | |
|---|---|---|
| DE | 198 46 327 C1 | 3/2000 |
| EP | 3 372 511 A1 | 9/2018 |
| WO | 2015/142390 A1 | 9/2015 |
| WO | 2016/030890 A1 | 3/2016 |

OTHER PUBLICATIONS

Greek Search Report Corresponding to 20200100176 mailed Nov. 23, 2020.

* cited by examiner

DOCKING STRUCTURE FOR SATELLITE DOCKING INCLUDING A PARALLEL MANIPULATOR WITH A TELESCOPIC CAPTURING PINCHER AND A PLURALITY OF MOTORIZED CLAMPS

1. FIELD OF INVENTION

The present invention relates to servicing, station keeping assistance and de-orbiting of spacecrafts, in particular satellites.

2. DESCRIPTION OF RELATED ART

U.S. Pat. No. 5,511,748 David R. Scott, Apr. 30, 1996 refers to Method for Extending the Useful Life of a Space Satellite.
U.S. Pat. No. 6,523,784B2 Frank Steinsiek, Hansjuergen Guenther, Bernd Bischof, Feb. 25, 2003 refers to Arrangement for Recovering Spacecraft.
U.S. Pat. No. 4,177,964 Edward J. Hujsak, LeRoy E. Siden, Dec. 11, 1979 refers to Docking System for Space Structures.
U.S. Pat. No. 4,588,150 Jurgen Bock, Gerd Gloyer, Horst Richter, Roland Felkei, May 13, 1986 refers to Docking Device for Space Vehicle.
U.S. Pat. No. 4,858,857 Gregory A. Lange, John P. McManamen, John A. Schliesing, Aug. 22, 1989 refers to Docking Mechanism for Spacecraft U.S. Pat. No. 6,354,540 James L. Lewis, Monty B. Carroll, Ray H. Morales, Mar. 12, 2002 refers to Androgynous, reconfigurable closed loop feedback controlled low impact docking system with load sensing electromagnetic capture ring.
U.S. Pat. No. 6,945,500 Dennis Ray Wingo, Sep. 20, 2005 refers to Apparatus for a Geosynchronous Life Extension Spacecraft.
US20180148197A1 Arie Halsband, Nevo Taaseh, Meidad Parient, Michael Reitman, May 31, 2018 refers to Docking system and method for satellites

3. BACKGROUND OF INVENTION

This invention concerns apparatus and methods for extending the useful life of a space satellite or space object, or for orbit modification or for de-orbiting of satellite or debris objects.

More particularly, the invention relates to such apparatus and methods for extending the useful operational lifetime of satellites which perform communications, weather reconnaissance, space reconnaissance and similar functions, or for the purpose of orbit modification of said satellites or other space debris, including their de-orbiting. The invention pertains to apparatus and methods for effecting planned deorbit and re-entry of a spent satellite or re-boosting a spent satellite to a higher orbit or trajectory to delay deorbit or to place the spent satellite in a parking orbit.

The high reliability of contemporary electronics enables the end-of-life (EOL) of most satellites to be caused by on board propellant depletion and the corresponding loss of attitude and position control, i.e., for orientation, pointing, including stabilization, and orbit control. In that sense, still operational satellites with all electronics on board in working condition, need to be decommissioned due to fuel depletion. In other cases, satellites launched fail to fully reach their planned orbit or fail to deploy their solar panels, becoming flying debris.

The present invention could provide a life extension solution for satellites in service. On the other hand, when the extension of the operating life of a satellite cannot be achieved for various reasons, e.g., other malfunctions of a satellite or its equipment which cannot be repaired or obsolescence of the satellite, it would be desirable to be able to affect a deorbit and re-entry. In this way, the inoperable or obsolescent satellite or other space debris will not continue to clutter the available space for working satellites and increase the likelihood of collision with other satellites or space vehicles. If the deorbit and re-entry can be pre-planned, these techniques will also reduce the possibility of re-entry into populated areas with possible disastrous results. Furthermore, even if planned deorbit and re-entry is not necessary, it would be desirable to provide apparatus and methods for re-boosting satellites which are cluttering useful orbits or which are about to deorbit, into less cluttered and less dangerous parking orbits. In such cases of planned de-orbiting operations, the proposed invention could provide a viable solution. Therefore, the principal object of the present invention is to provide apparatus and methods for extending the useful life of a space satellite, or alternatively is to provide apparatus and methods which permit planned deorbit and re-entry of spent satellites, or permit re-boosting spent or obsolete satellites to a parking orbit. The present invention proposes an innovative method for the achievement of these objectives that guarantees successful and risk-free operation even if the target satellite or debris is tumbling, which is not the case of other related patents in the field. Indeed, many related patents address the docking problem only in the case of stabilized clients. In the case the client is a defunct spacecraft tumbling out of control, current patented methods for docking cannot be applied without risks of collision. Furthermore, the proposed invention addresses the issue of positioning accuracy of the servicer satellite in the proximity of the target satellite, which constitutes a major problem for the capturing and docking operation. The present patent allows the positioning error to become considerable (in the order of 0.5 m or more), without compromising the success of the operation. Additionally, the invention addresses the issue of significant force development on gripper level during capturing, due to possibly existing relative rates between servicer and target satellites, through the use of an adaptive compliance kinematic structure. An explicit control method is presented in order to deal with forces generated during the docking operation that could damage the docking structures if not attenuated. Furthermore, the present invention addresses the critical issue of stack rigidity post docking, with a highly optimised multi-point capturing solution that guarantees rigidity and controllability of the stack while minimising the mass of the docking system. Finally, the invention presents the overall configuration of the proposed docking system arranged to fit in a standard small volume satellite, proving that the present concept can be used for servicing and de-orbiting missions at a decreased, competitive cost.

4. SUMMARY OF THE INVENTION

The present invention relates to a service satellite having a body, a controller and a docking unit. The service satellite is purposed to dock and secure a rigid, geometrically deterministic position on the launch adapter ring of a client spacecraft, with the purpose of life extension, servicing or de-orbiting the client. The docking unit includes a deployable 6 degree of freedom parallel manipulator (also known as Stewart platform) which is equipped with a deployable telescopic arm that extends vertically from the Stewart platform end effector plate, at a distance depending on the dimensions of the vessels, roughly 1-1.5 times the diameter of the client's launch adapter ring. The telescopic arm bears a pincher with a pair of fast closing digits at its free extremity, that can be automatically controlled to securely grasp on the launch adapter ring of the client, once the pincher's optical sensors confirm that it is correctly placed at their vicinity. The a-priori known LAR (launcher adaptor ring) geometry of the client and a combination of measurements on the pincher contactless proximity sensors, guarantee the possibility to correctly activate the pincher for this operation. Initially, the telescopic arm is deployed on the vicinity of the LAR and at safe distance from the client vessel. The proximity sensors operating on the pincher provide information on the exact distance of the pincher from the client and the arm is rotated and possibly retracted in order to further approach the LAR. Further combined measurements from the proximity sensors confirm that the pincher is in position to launch a grasping operation. The pincher then activates the fast closing digit that secures grasping in a fraction of a second. Once the pincher has secured the initial capture of the LAR, the Stewart platform enters in active compliance mode moving in a way to cancel the forces developed on pincher level due to potential rate differences between the two vessels. Possible tumbling is then attenuated through the use of the servicer's reaction wheels and wheel-unload jets. This de-tumbling and rate cancellation mode is maintained until both vessels have zero relative rates. At this point the telescopic arm is slowly retracted and the servicer is brought nearer to the LAR. At this point, at least one clamp rigidly mounted on the Stewart platform end effector enters in contact with the LAR and rigidly grabs it, in a fully deterministic manner, based on the a priori knowledge of the LAR profile. Two articulated foldable arms are then deployed from the sides of the client, using single dof actuators, reach also the LAR at fully deterministic locations, roughly equally spaced from each other forming three roughly equally spaced grabbing locations with respect to the initial clamping position. The articulated arms are also equipped with clamping mechanisms that close firmly around the LAR section once their location is confirmed. In that way the servicer secures a three-point connection with the client LAR, guaranteeing stack rigidity and permitting station keeping and de-orbiting operations.

5. BRIEF DESCRIPTION OF THE DRAWINGS

The objects and advantages of the invention will be apparent to those skilled in the art from the following detailed description thereof, taken in conjunction with the drawings, in which.

Figure 3A:
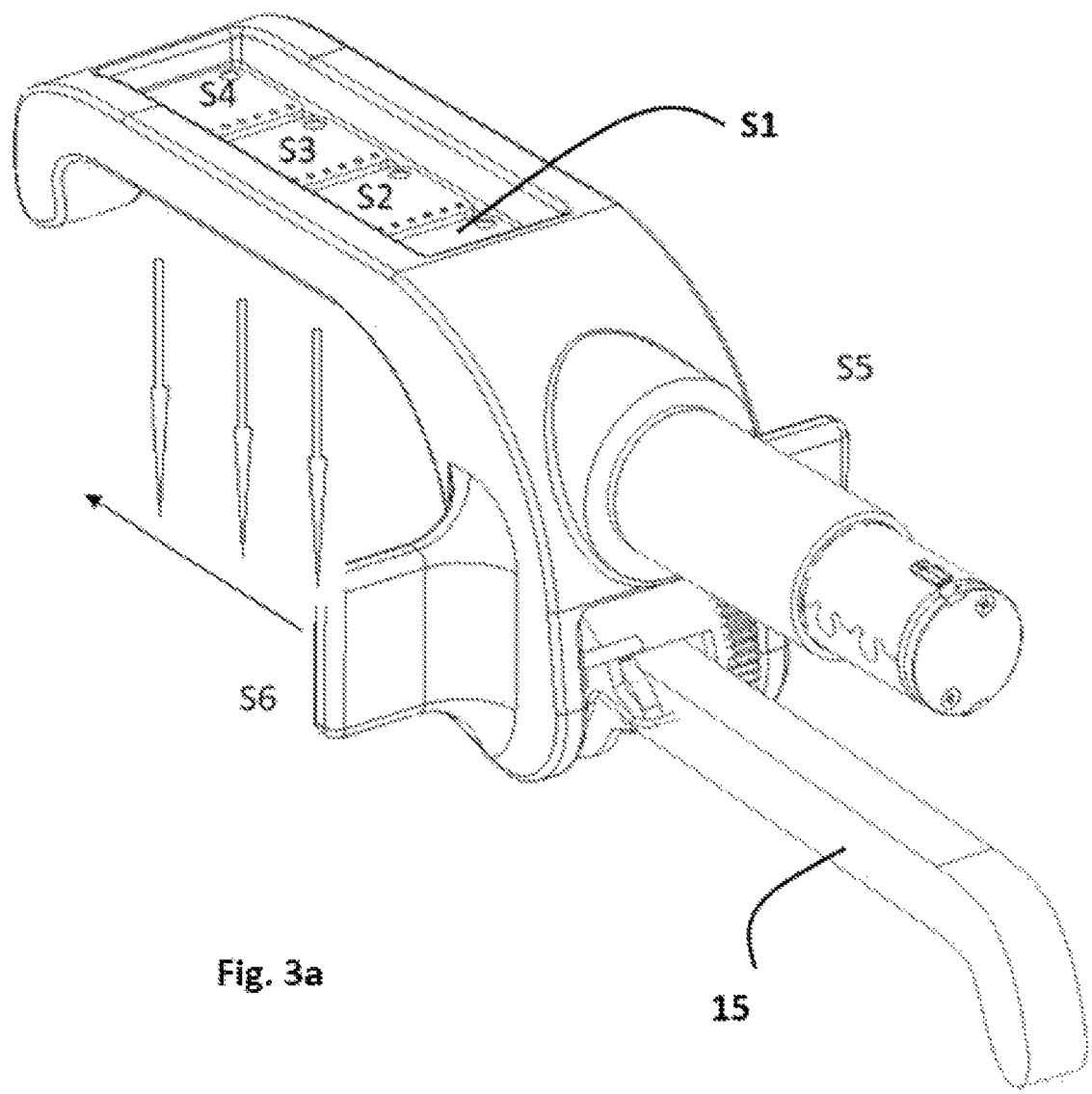

FIG. 3a presents a side view of the end-effector pincher in open position, which is mounted on the 125 said telescopic arm.

Figure 3B:
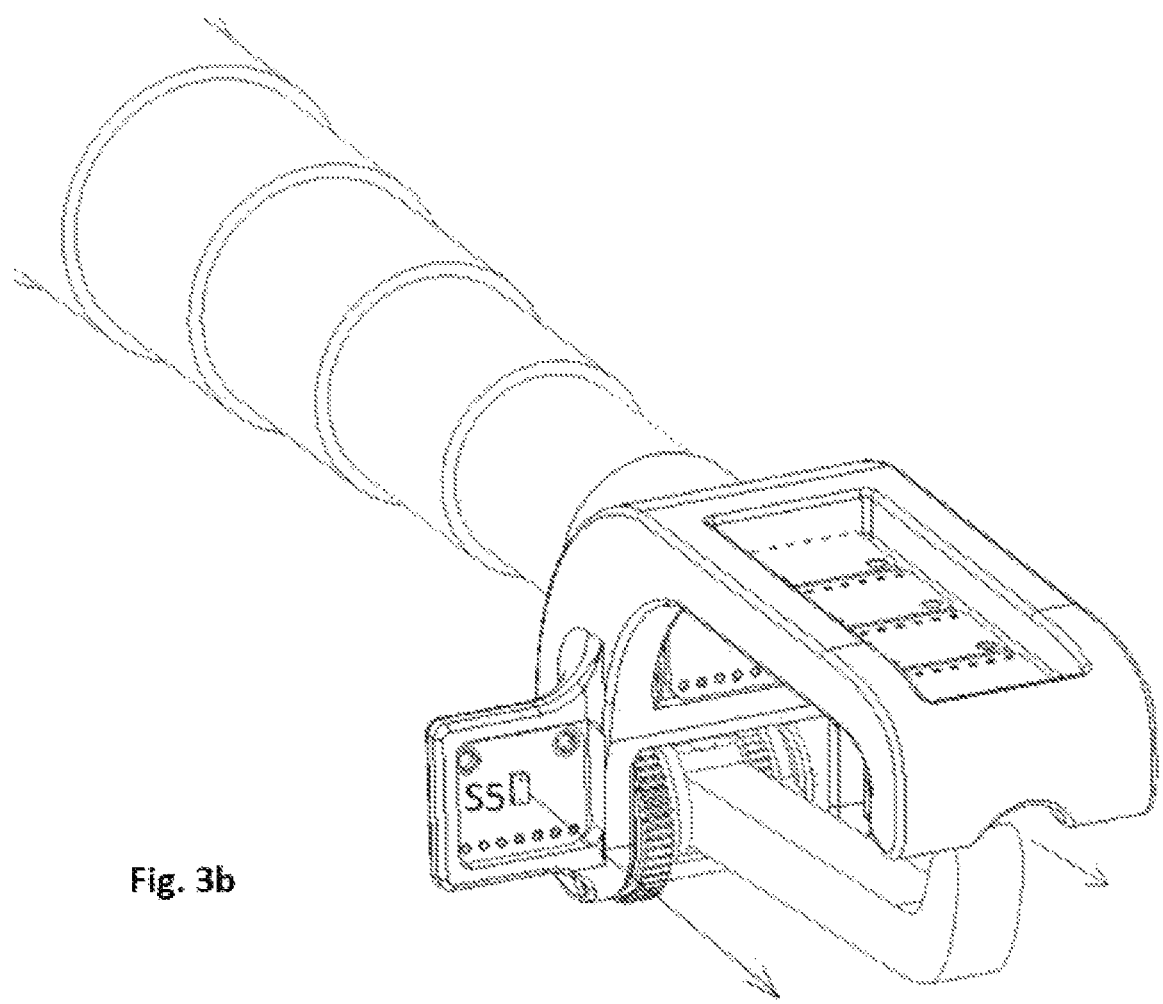

FIG. 3b is a view of the pincher in closed position, which is mounted on the said telescopic arm.

Figure 3C:
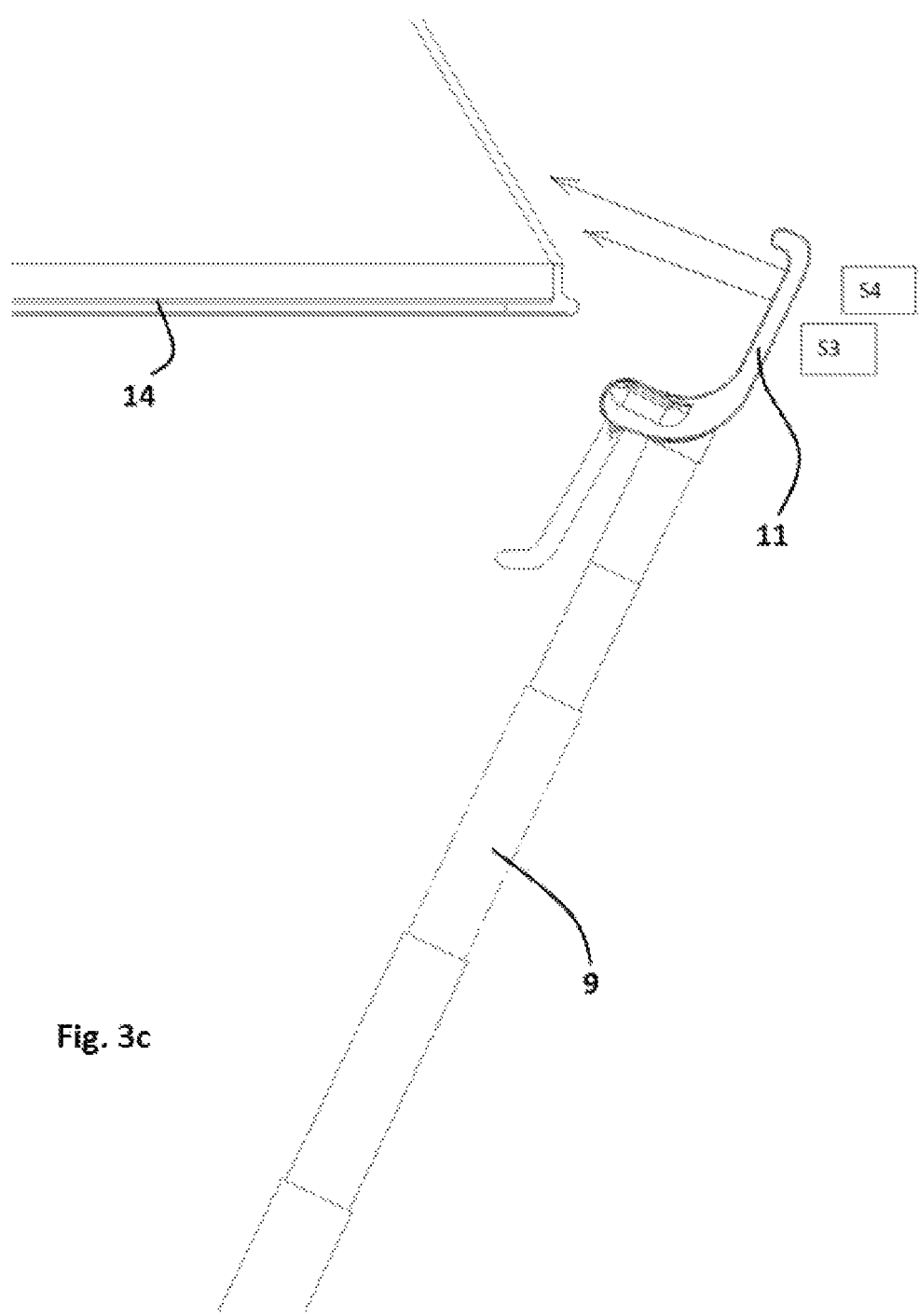

FIG. 3c is a side view of the pincher with presentation of the location of the proximity sensors integrated in its structure, explaining the method used for capturing.

Figure 3D:
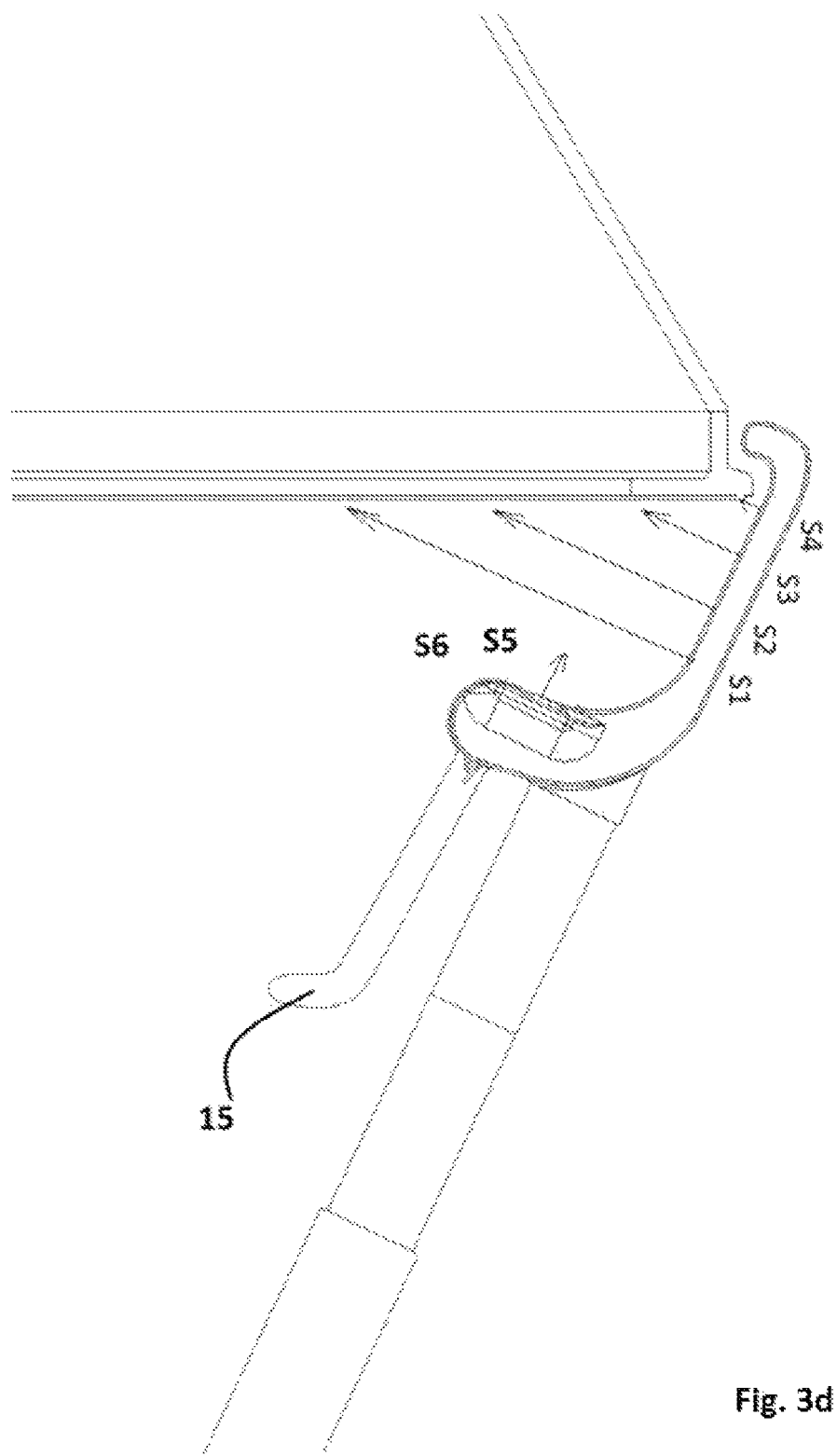

FIG. 3d is a side view of the pincher with further presentation of the location of the proximity sensors integrated in its structure, explaining the method used for capturing.

Figure 4A:
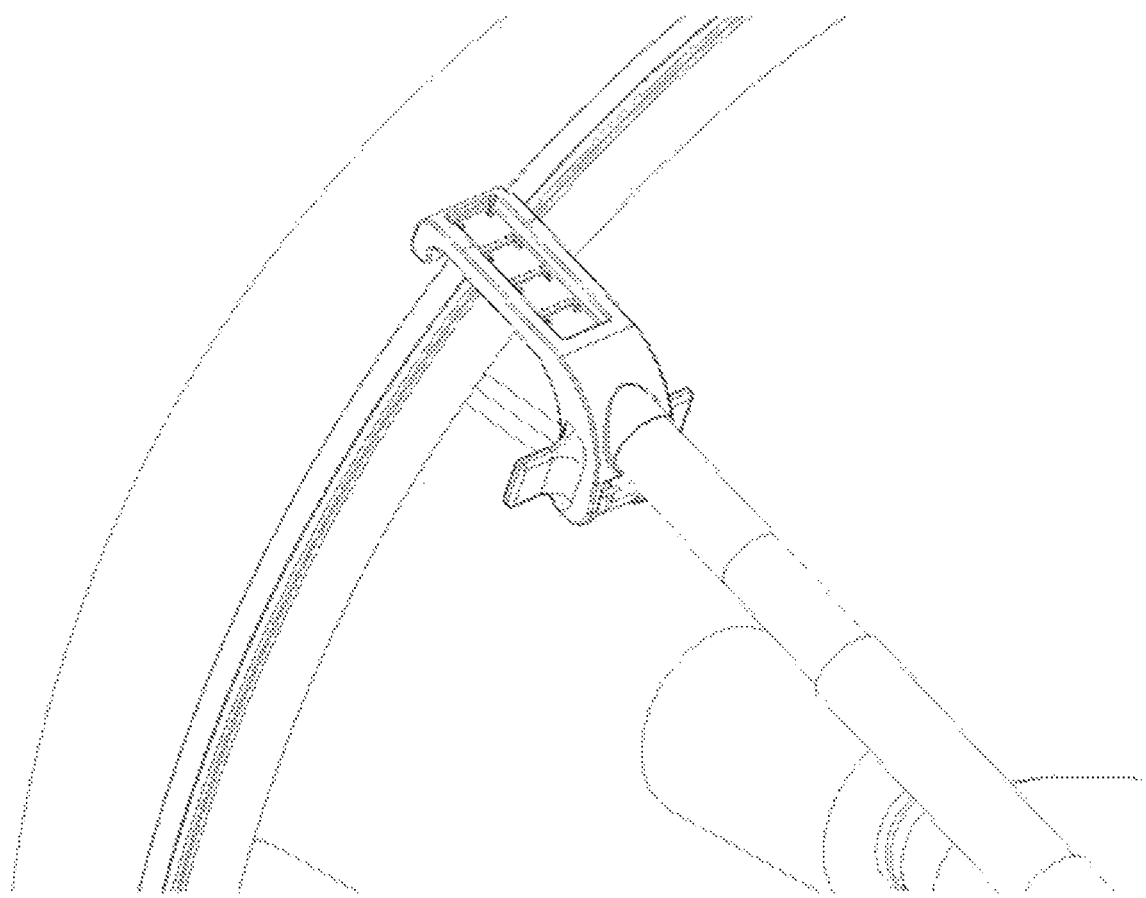

FIG. 4a is a close view of the pincher having secured a grasping on the client's launcher adapter ring.

Figure 4B:
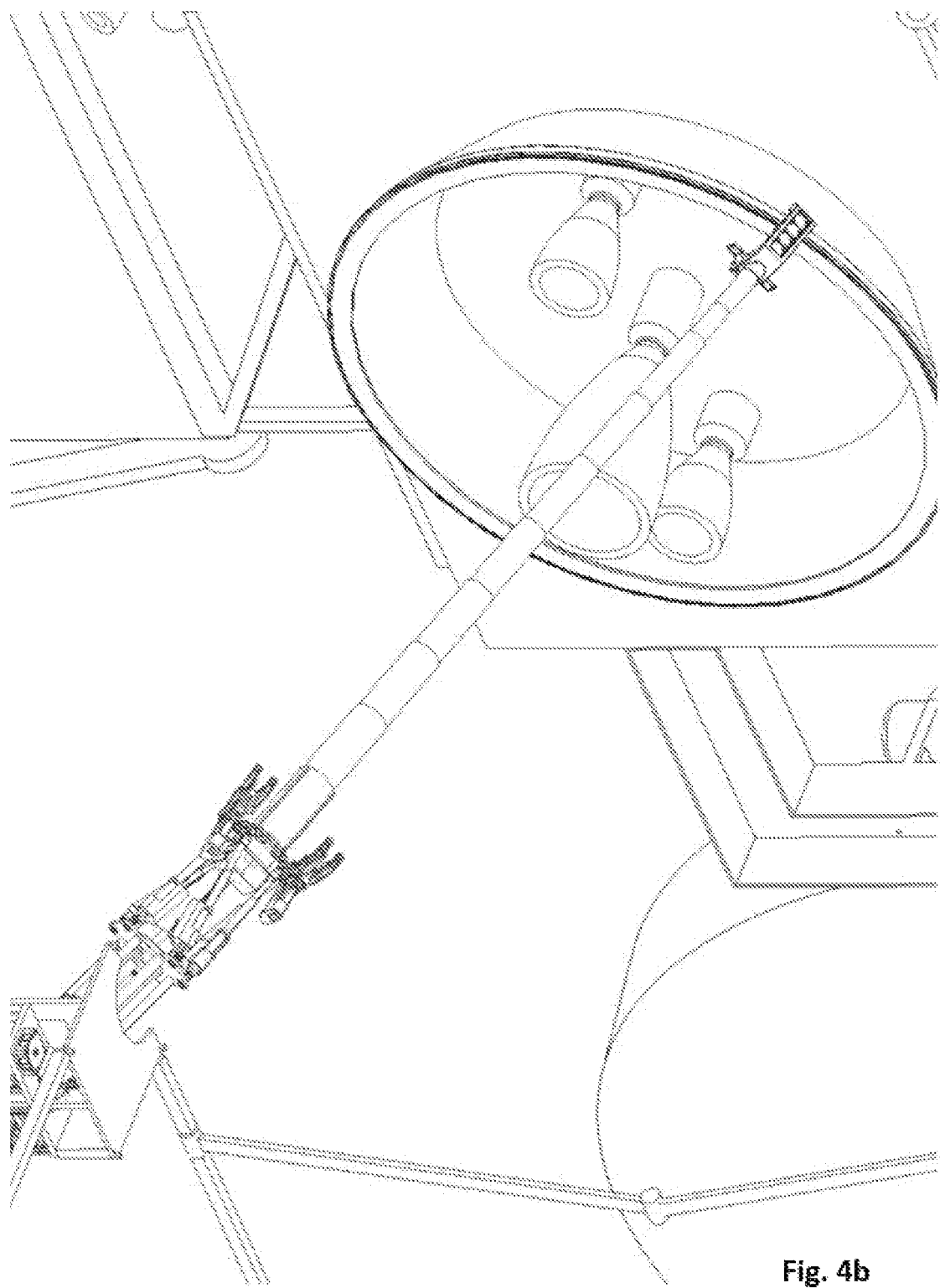

FIG. 4b is a view of the deployed Stewart platform with the pincher having achieved to grasp the target launch adapter ring.

FIG. 5, 5a, 5b, 5c, 5d, 5e, 5f are close views of the pincher and the detailed parts that compose it, such as the spring coiled digit, fast release spring, single sense of rotation mechanism etc.

Figure 6:
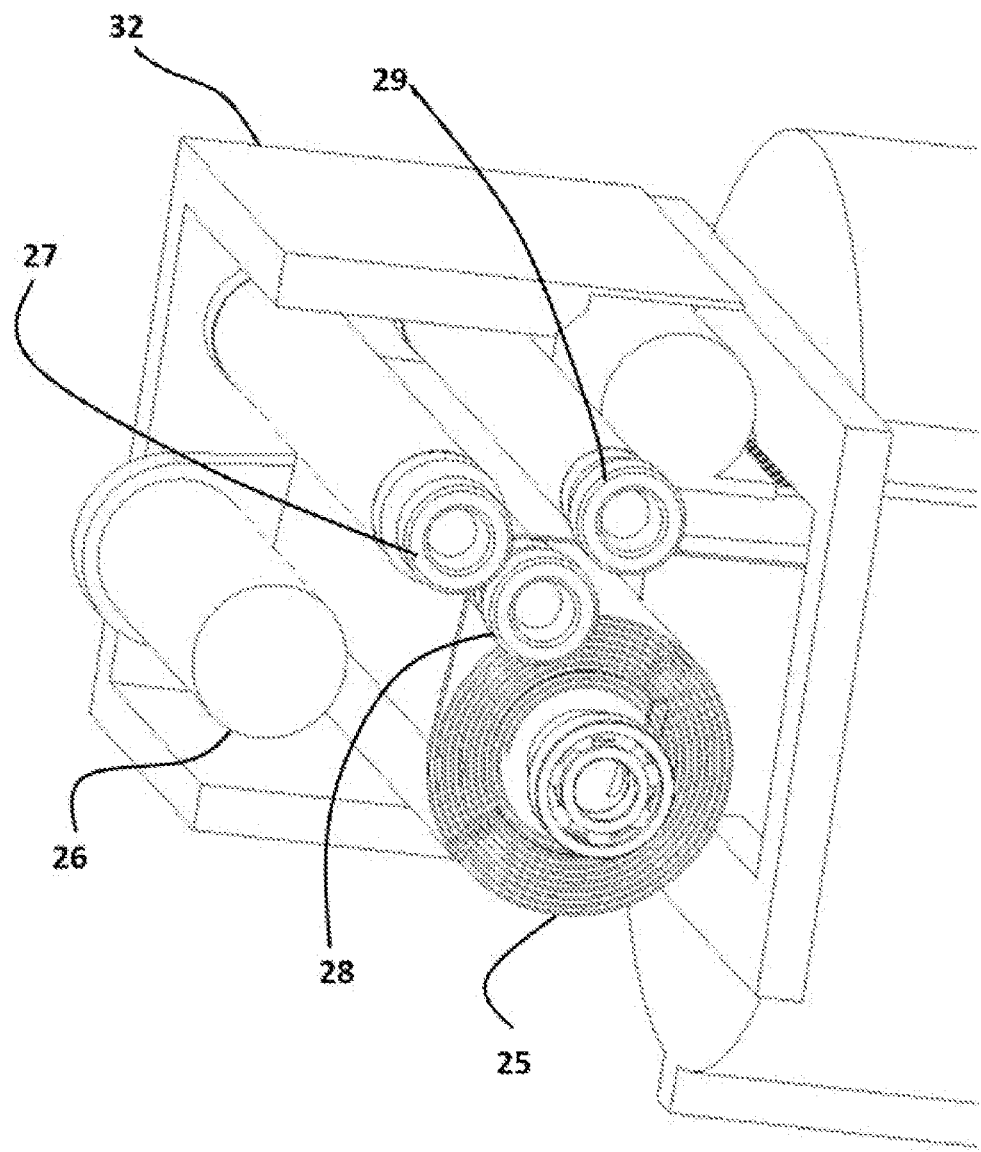

FIG. 6 shows a detail of the stem drum used for the extension and retraction of the telescopic means carrying the pincher.

Figure 6A:
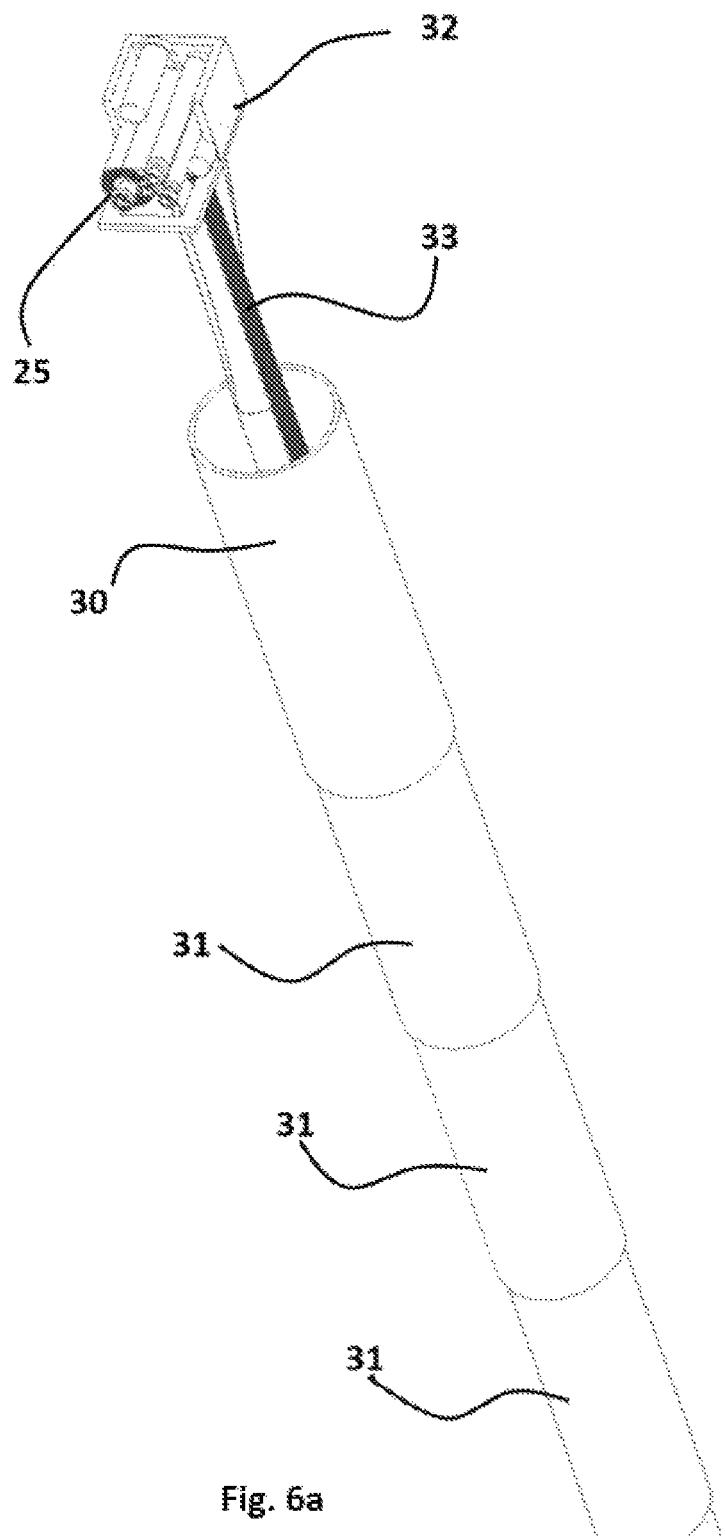

FIG. 6a shows a detailed view of how the stem extending the telescopic arm is deployed and how the telescopic part of the arm is extended and retracted by the stem.

Figure 6B:
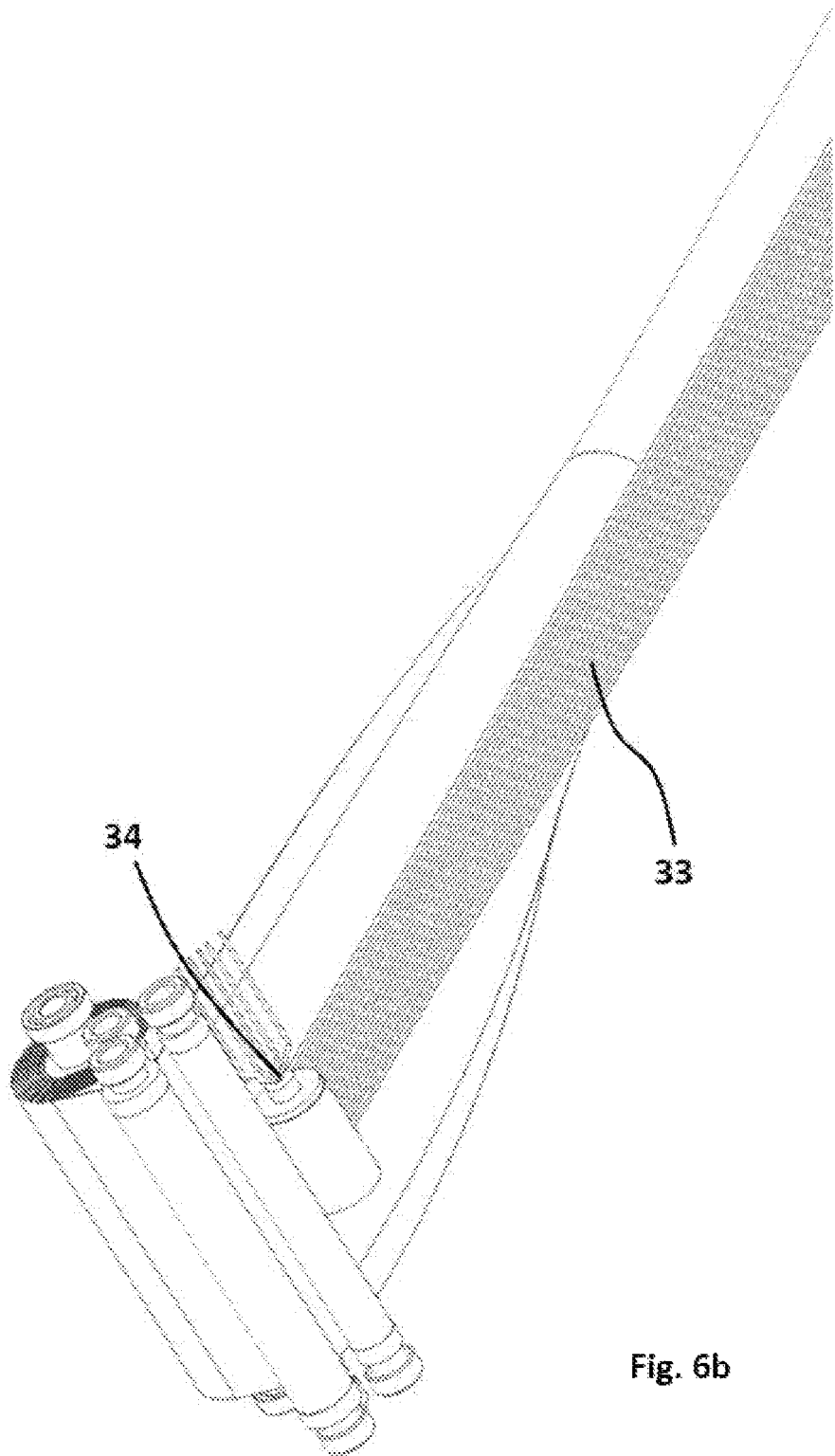

FIG. 6b shows a detailed view of the deployed stem, also carrying a cable ribbon with the actuation and data signals connecting the pincher and the sensors to the end effector plate of the parallel manipulator, also including a signal transmitting electrical slip ring.

Figure 6C:
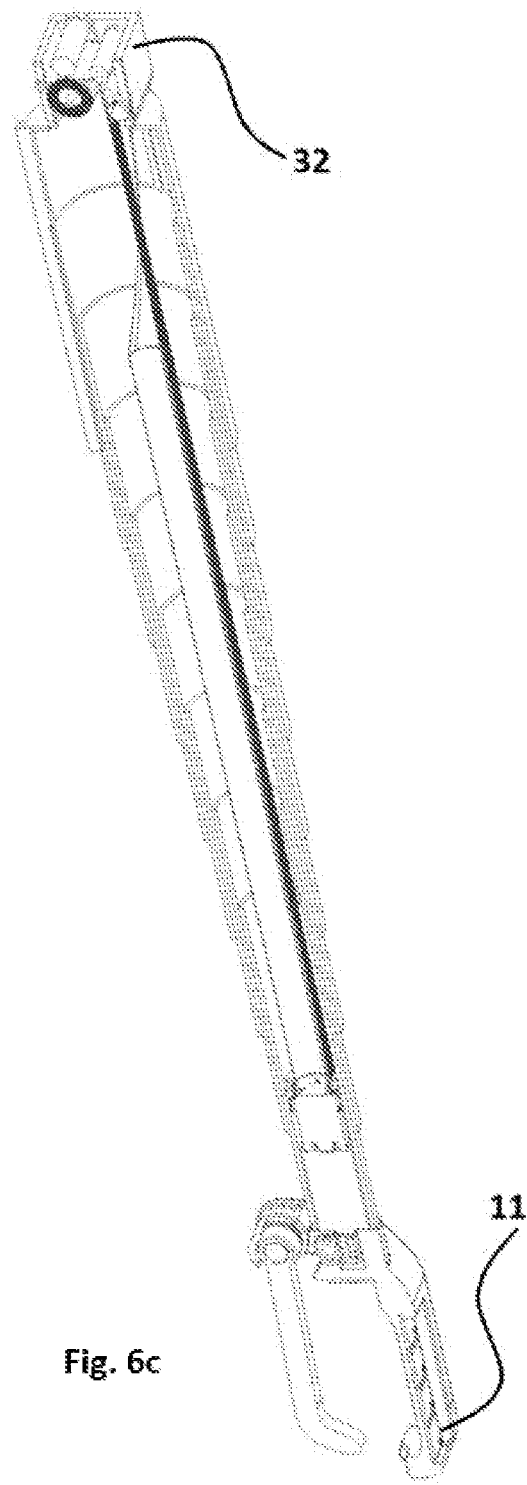

FIG. 6c shows a detailed cut view of the deployed stem, including the multiple telescopic cylinders forming the arm, as well as the end effector pincher mounted on the arm extremity.

Figure 7:
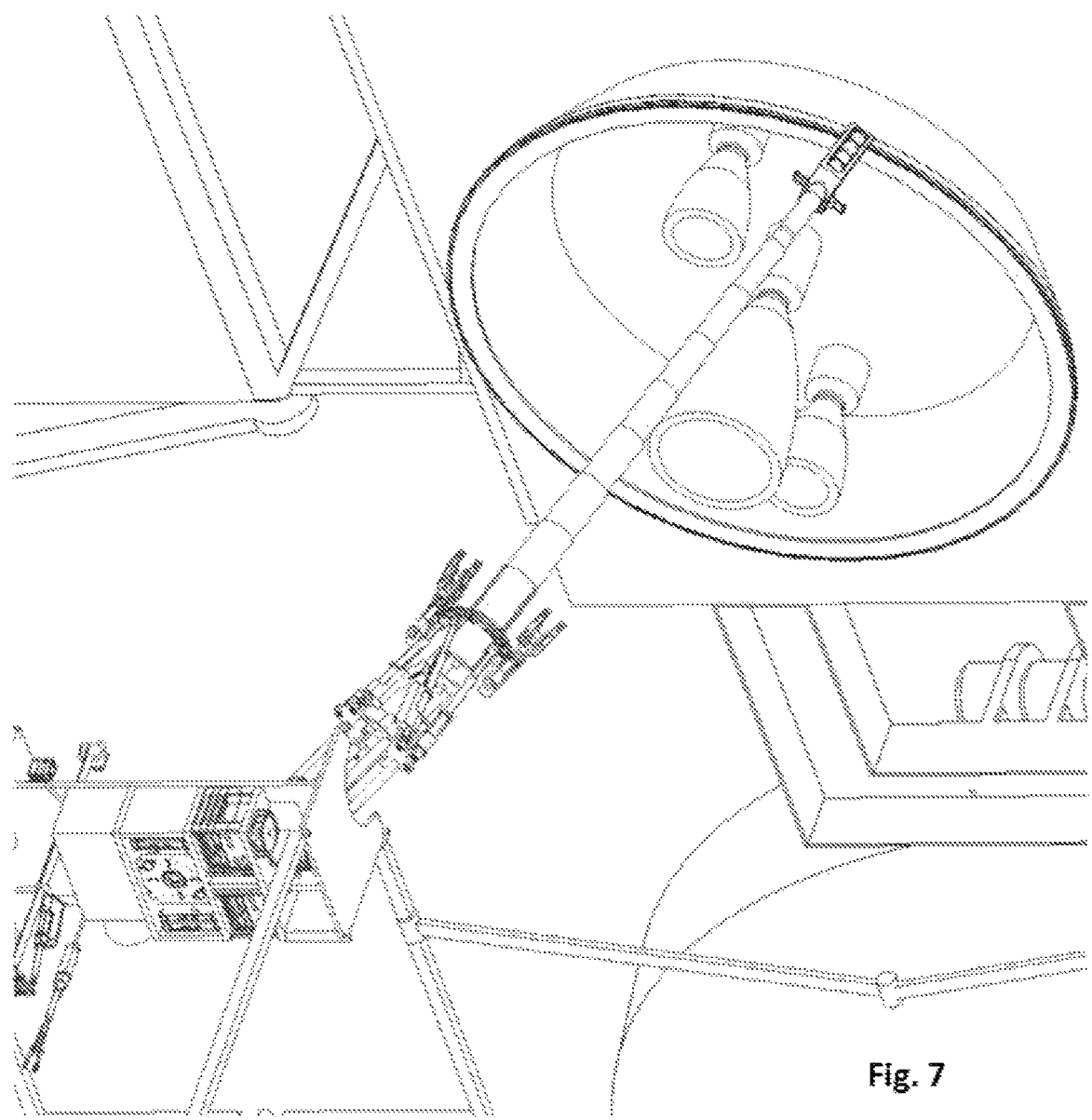

FIG. 7 shows the 2 connected vessels with the telescopic means starting to retract, while the servicer approaches the client.

Figure 7A:
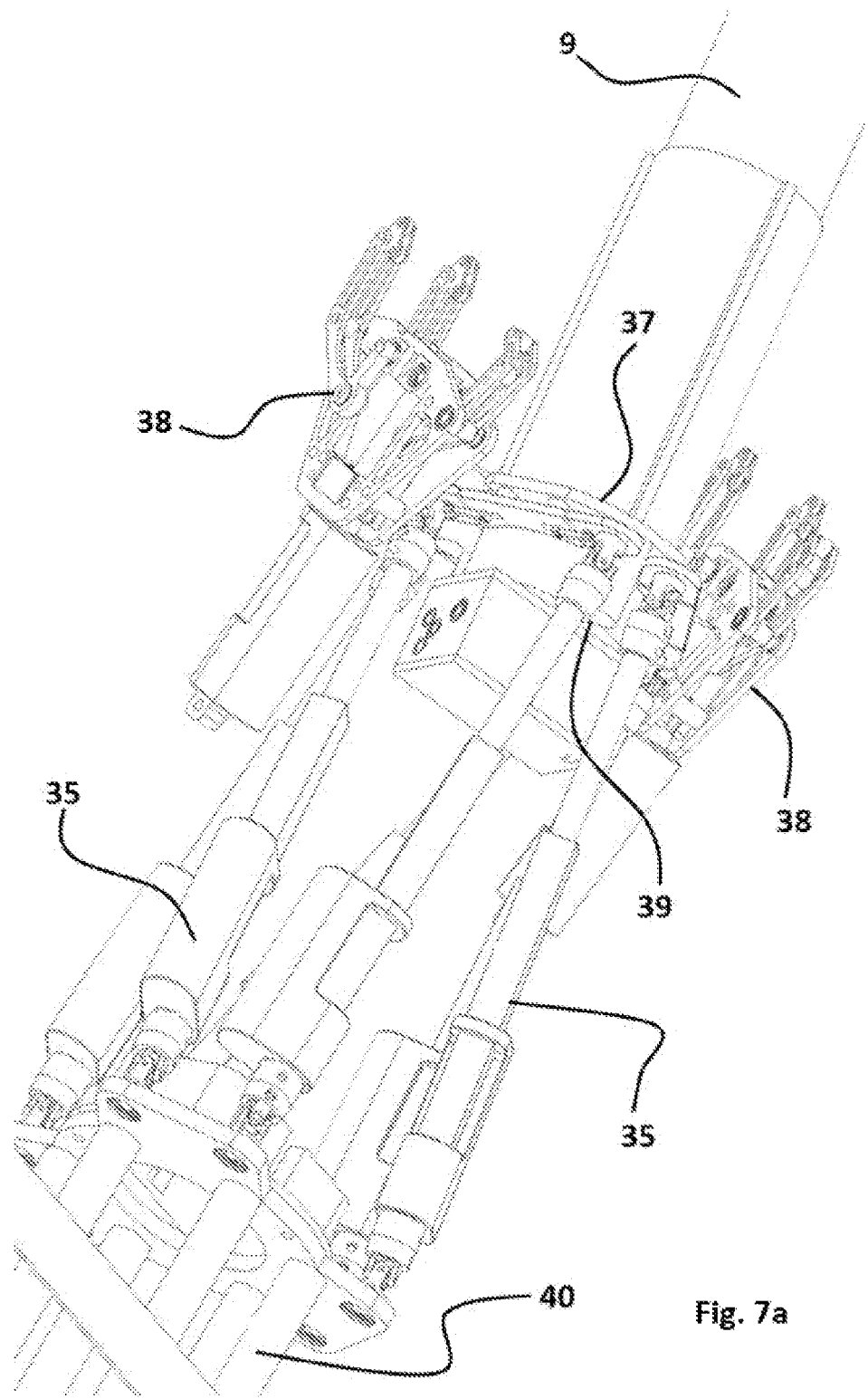

FIG. 7a shows the detail of the motor location operating the external cylinder of the telescopic arm, for the purpose of fully collapsing the telescopic arm towards its locking position.

Figure 7B:
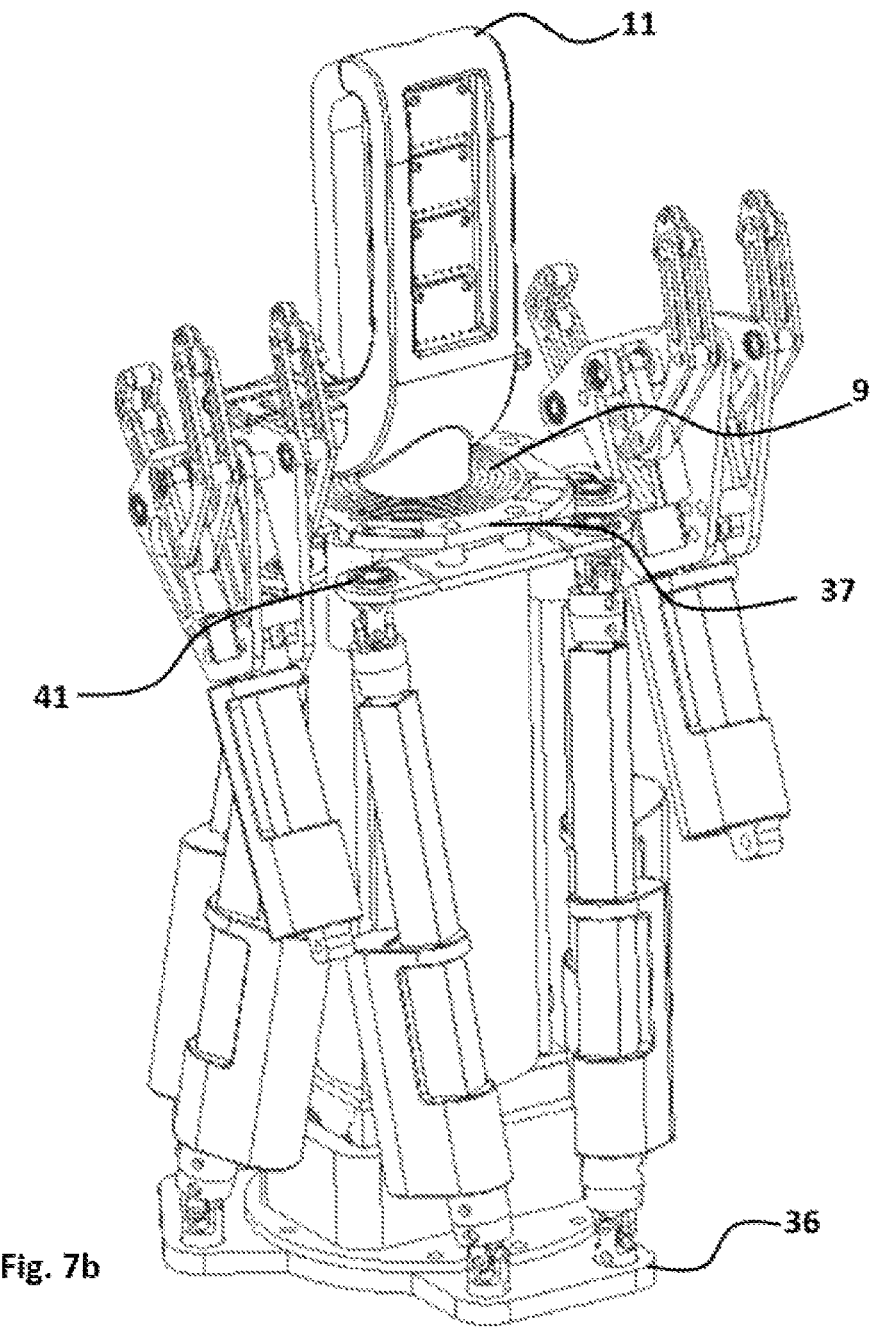

FIG. 7b shows a detailed view of the Stewart Platform manipulator and the collapsed telescopic arm with the closed pincher mounted on it.

Figure 7C:
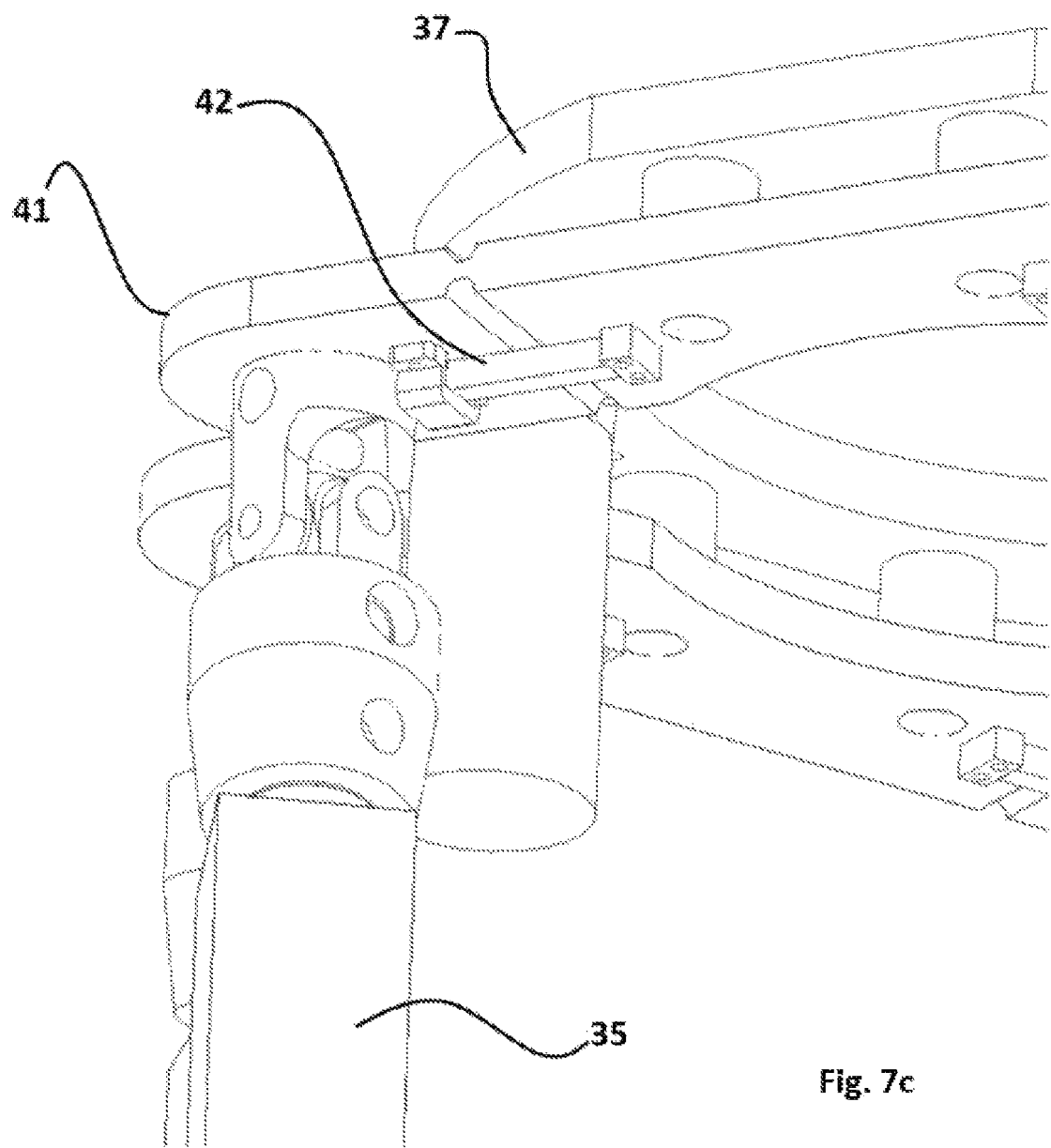

FIG. 7c shows how the force sensors are mounted on the end-effector plate of the Stewart platform with the purpose of measuring forces generated on the telescopic arm.

Figure 7D:
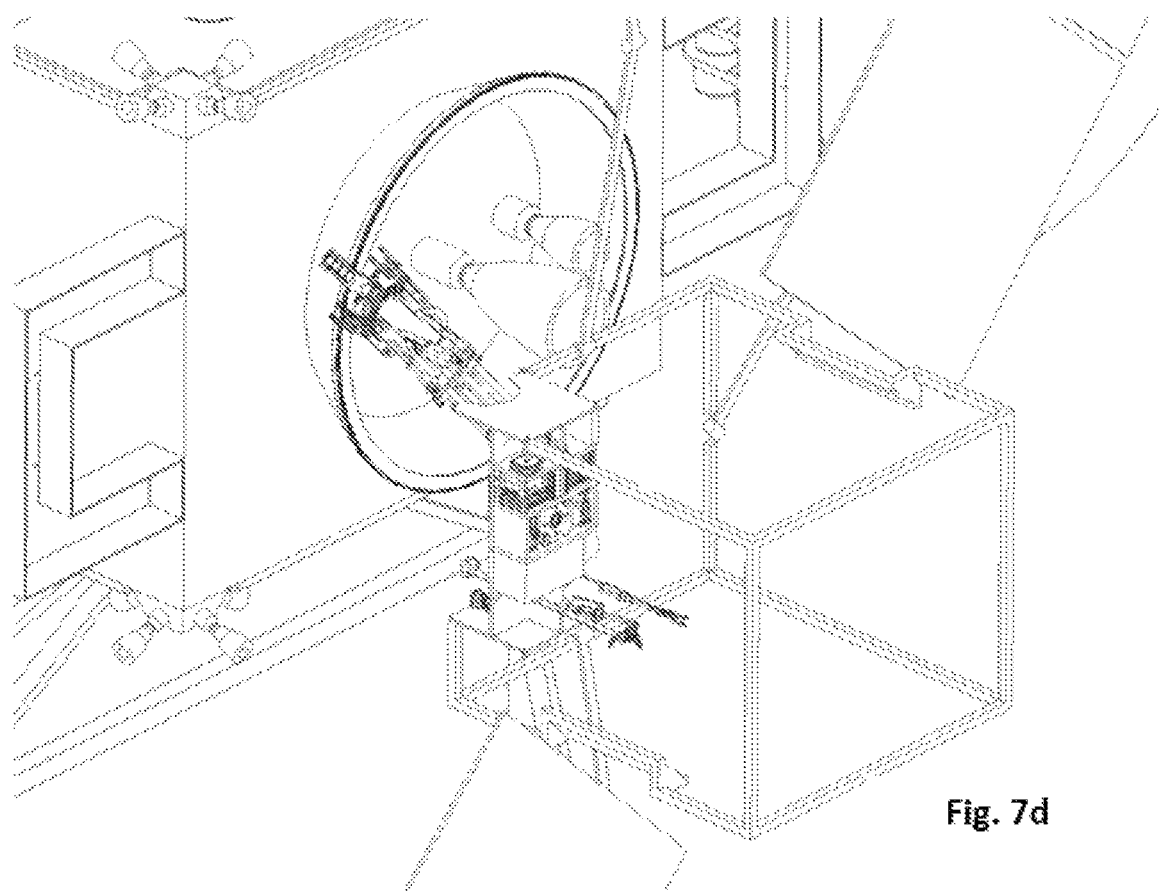

FIG. 7d shows an overview of the 2 vessels with the telescopic arm fully collapsed.

Figure 7E:
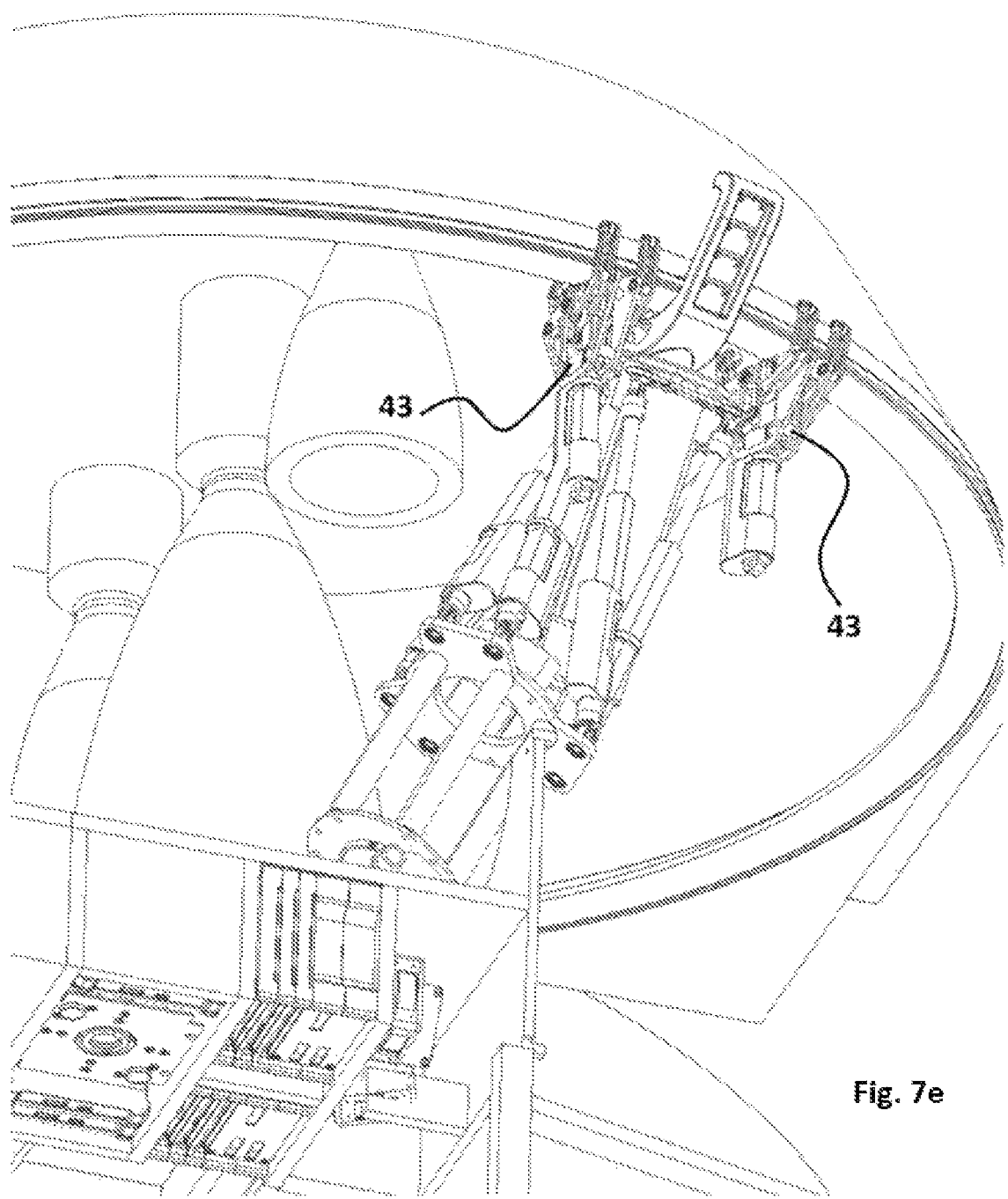

FIG. 7e shows a detailed view of the clamps mounted on the end effector of the Stewart platform approaching the LAR of the client, positioned for grasping the launch adapter ring of the client.

Figure 8:
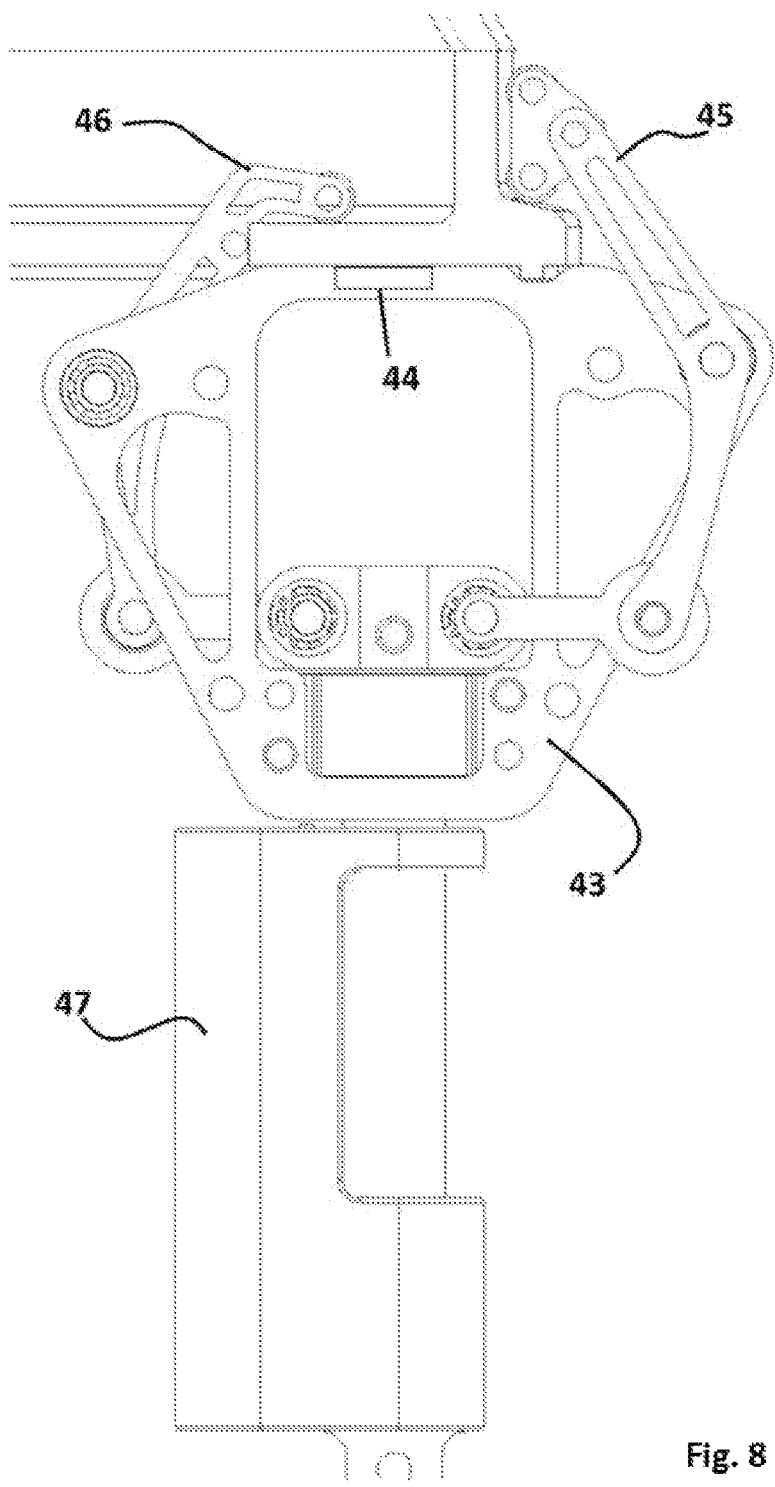

FIG. 8 shows a side detailed view of the clamp, which is tailored designed for the specific LAR section, fully closed around the LAR section.

Figure 9A:
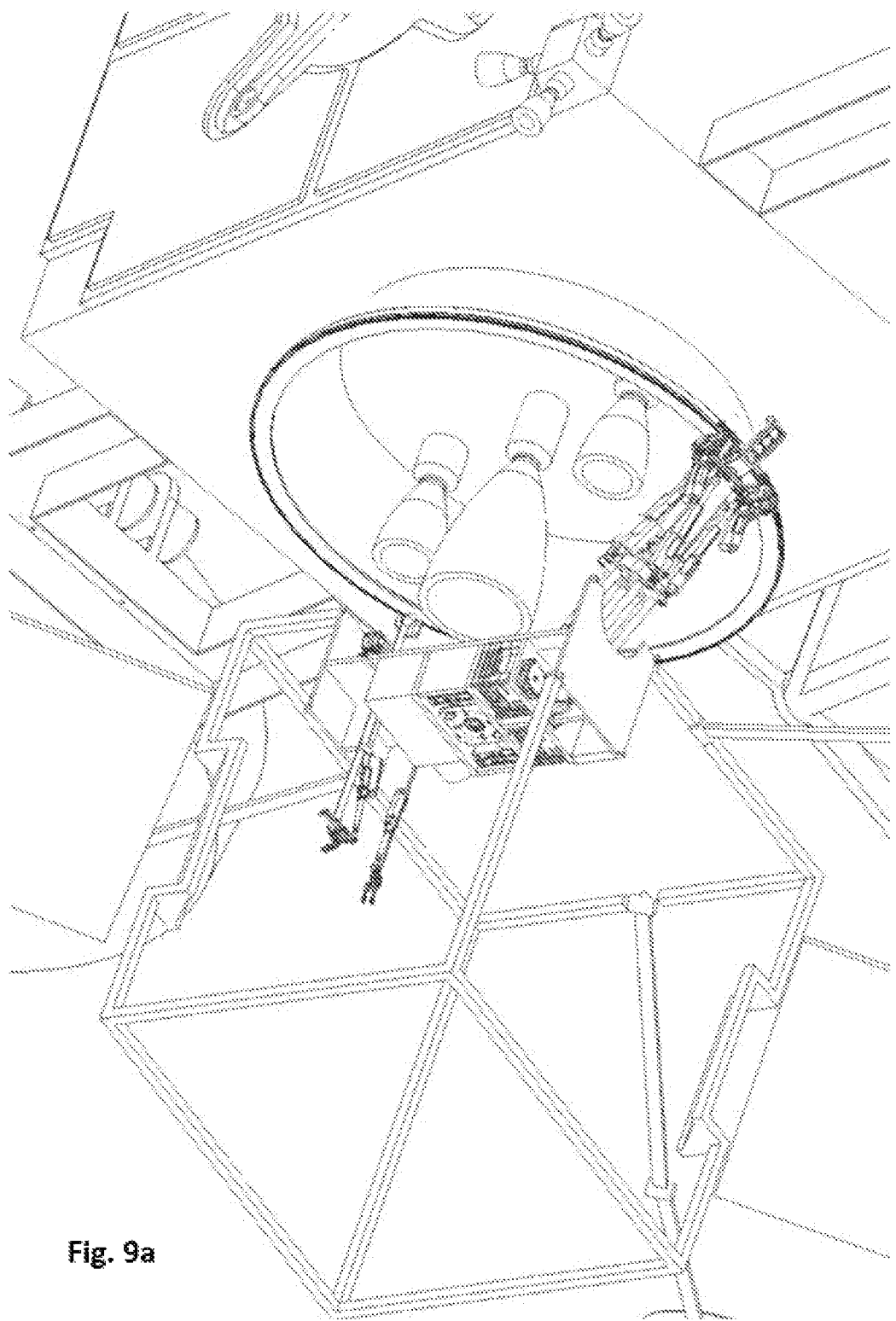

FIG. 9a shows the Stewart platform parallel manipulator entering nominal position, with the servicer being forced to rotate.

Figure 9B:
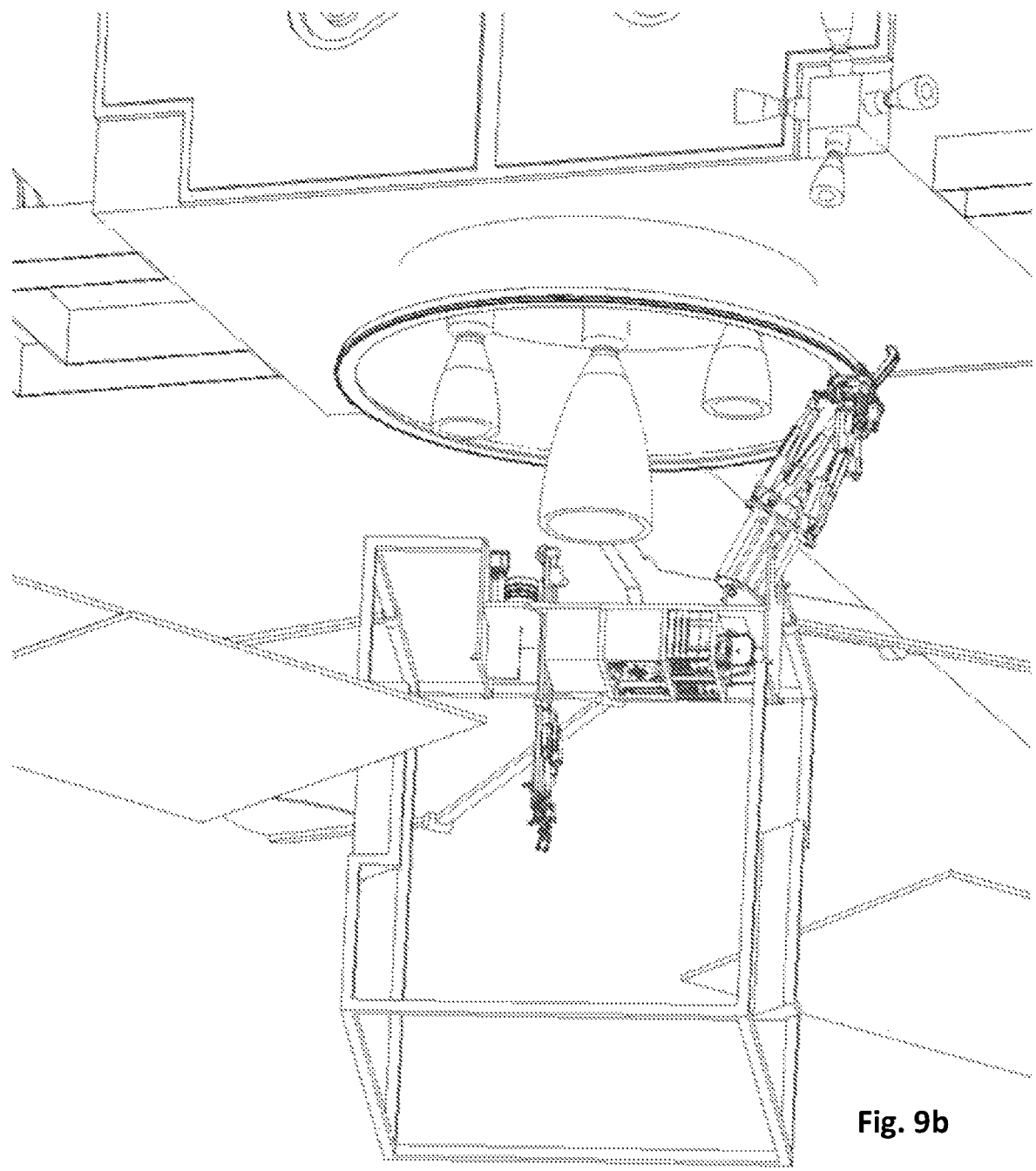

FIG. 9b shows the side view of the process of driving the parallel manipulator into nominal position, so that the full rigidity of the docking can be achieved.

Figure 9C:
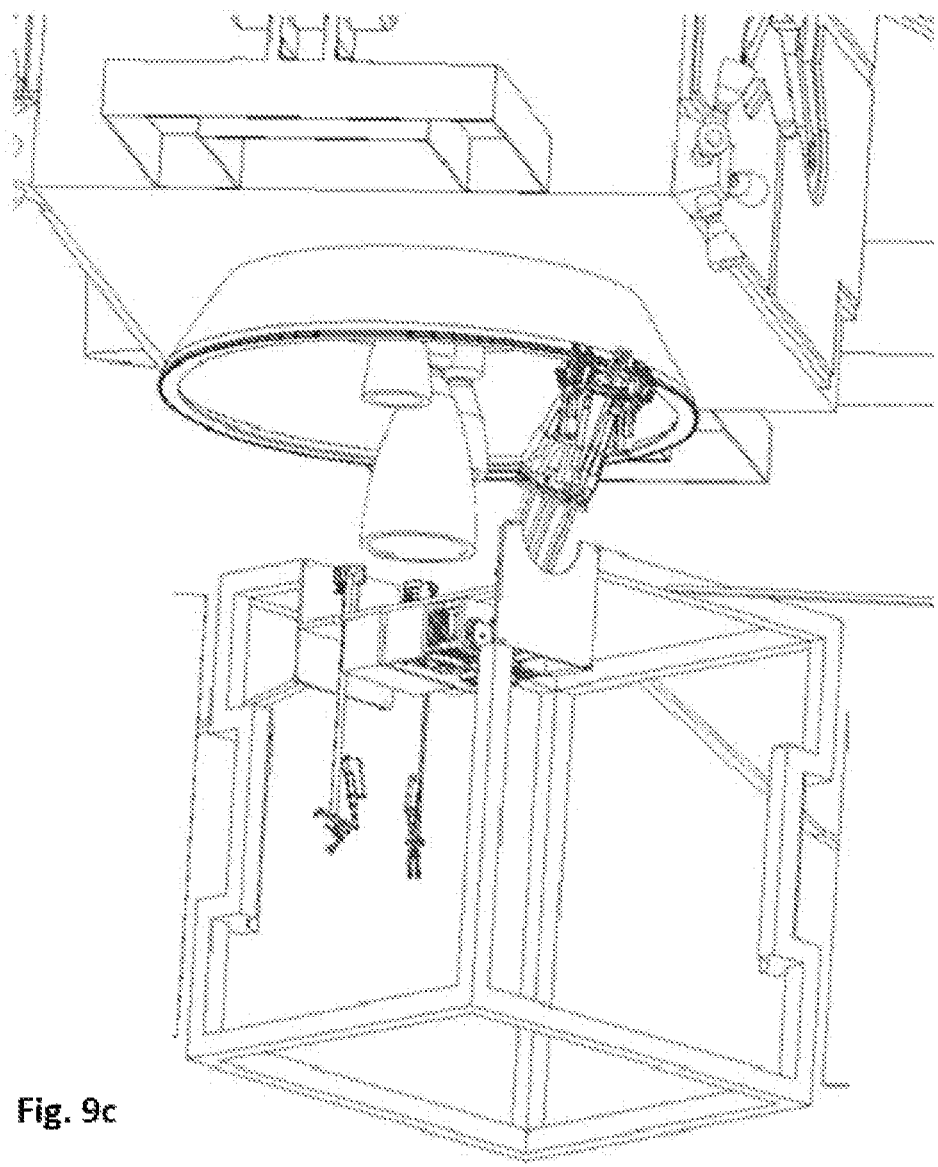

FIG. 9c shows a close view of the parallel manipulator entering nominal position with the servicer craft already rotated relative to the client.

Figure 9D:
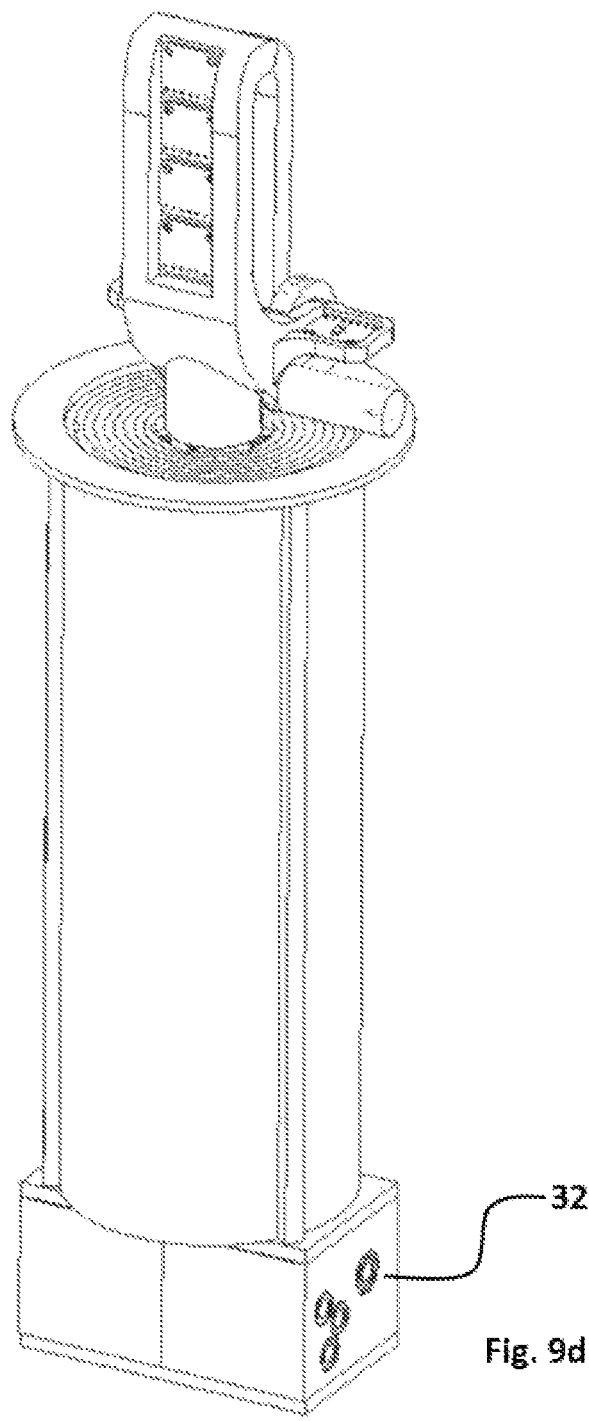

FIG. 9d shows a detailed view of the collapsed telescopic arm.

Figure 9E:
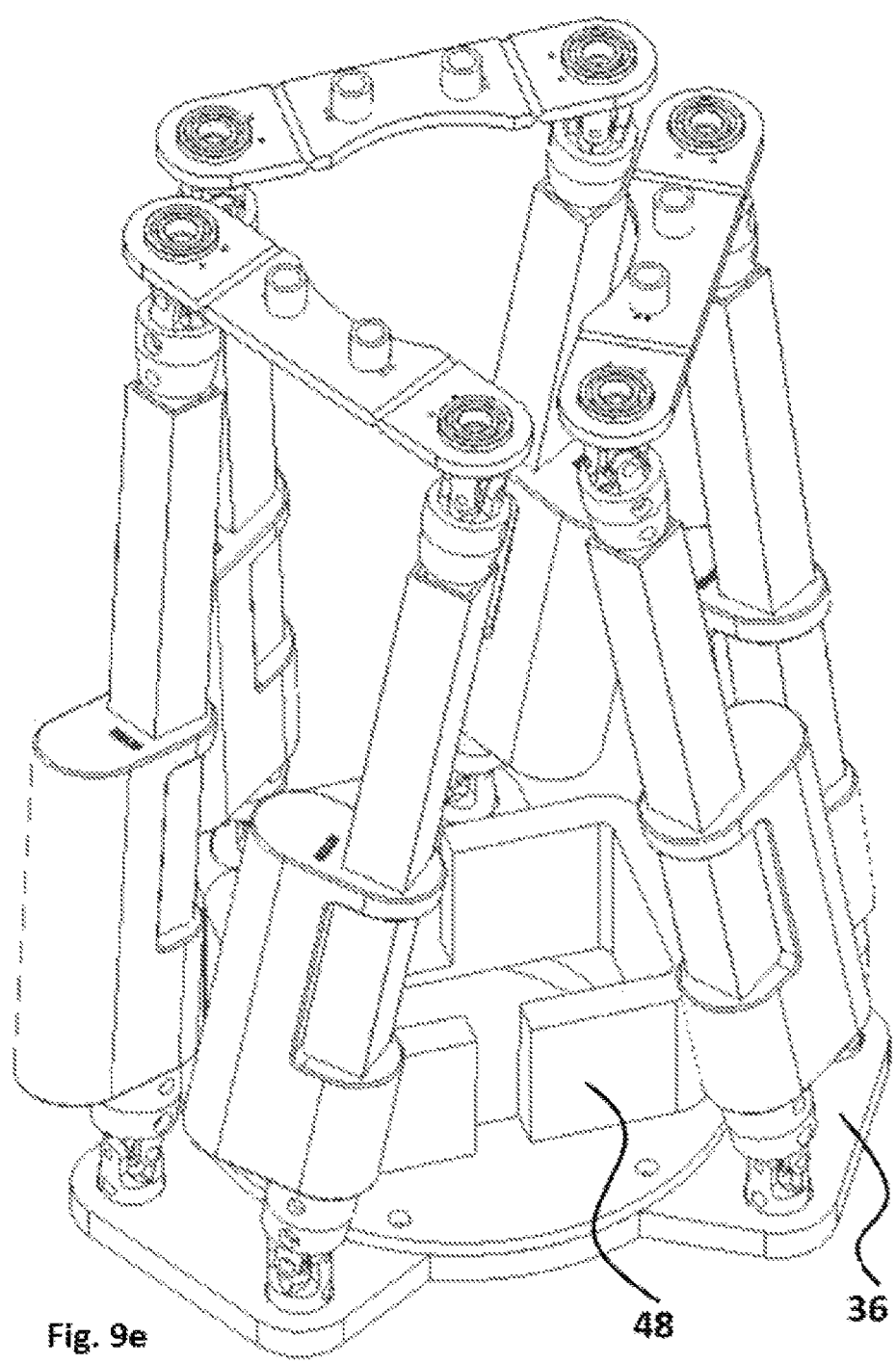

FIG. 9e shows a detailed view of the Stewart platform with the receptacle of the telescopic arm at its base.

Figure 9F:
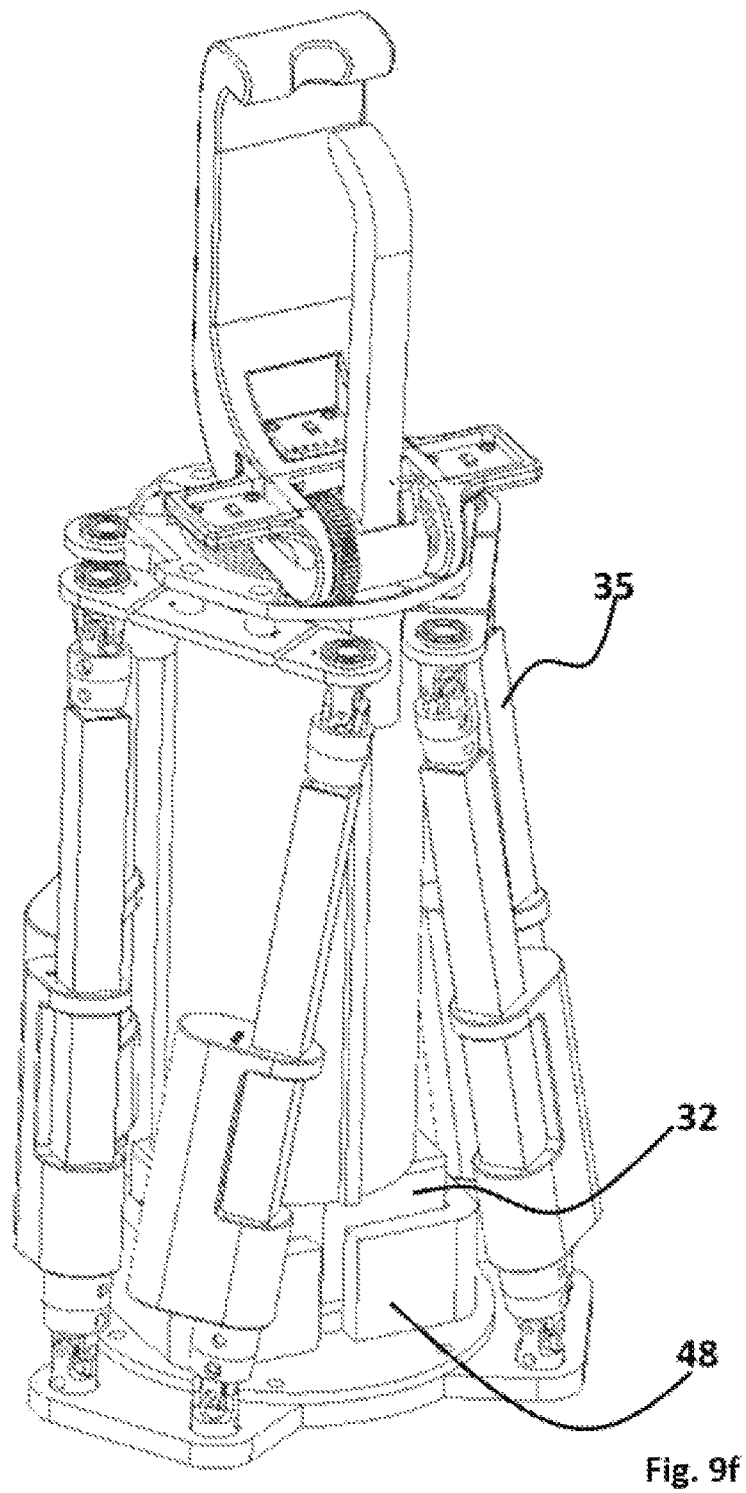

FIG. 9f shows the telescopic arm locked in the base of the Stewart platform, having reached the locking position at the base of the parallel manipulator and being secured there. At this position, the platform is also locked since the retraction of the telescopic arm has rigidized the entire parallel mechanism, with the base of the arm locked in the base of the Stewart platform. The location of the platform and the servicer vessel is now fully determined vis a vis the LAR of the client.

Figure 10:
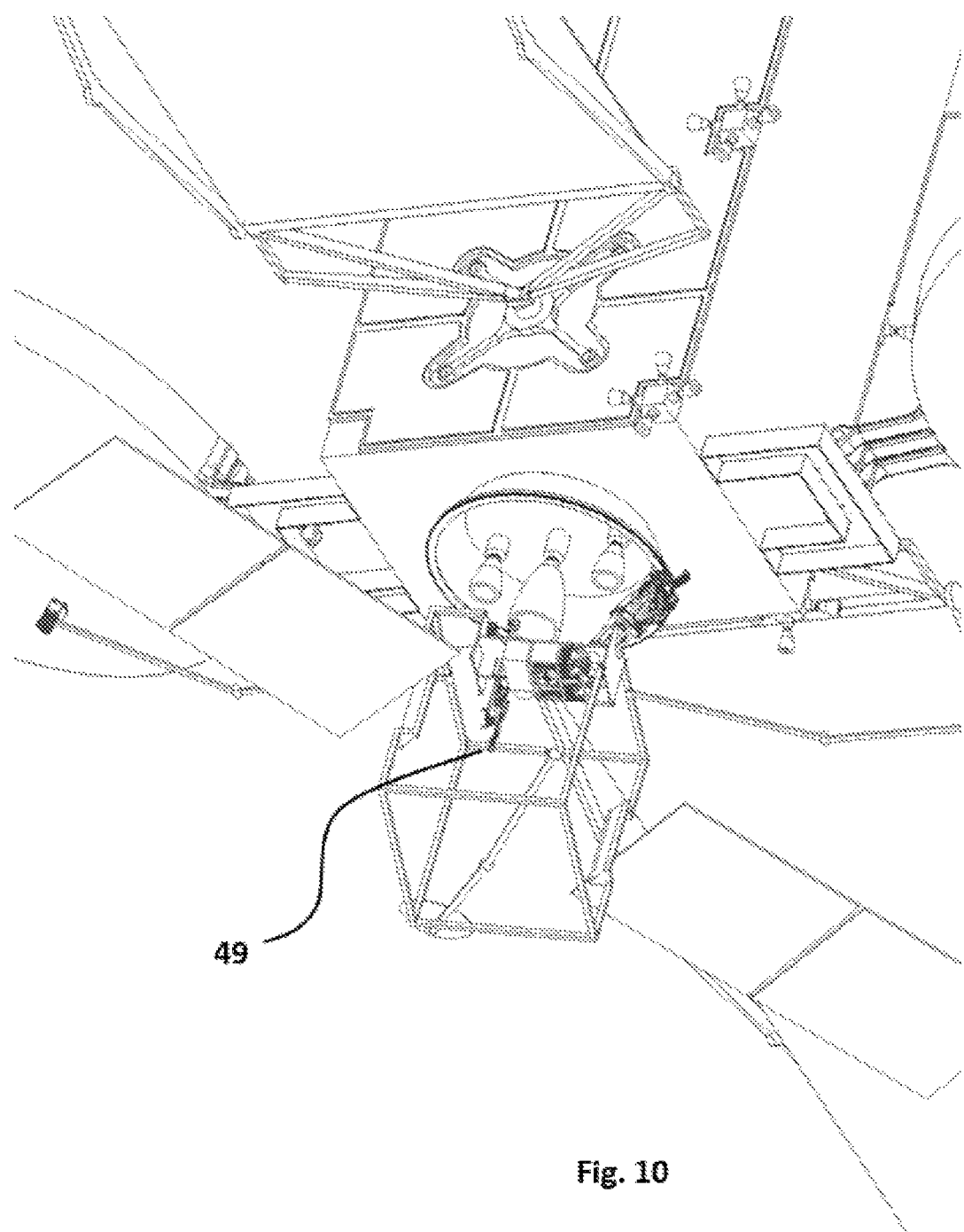

FIG. 10 shows an overview of the stabilised stack

Figure 10A:
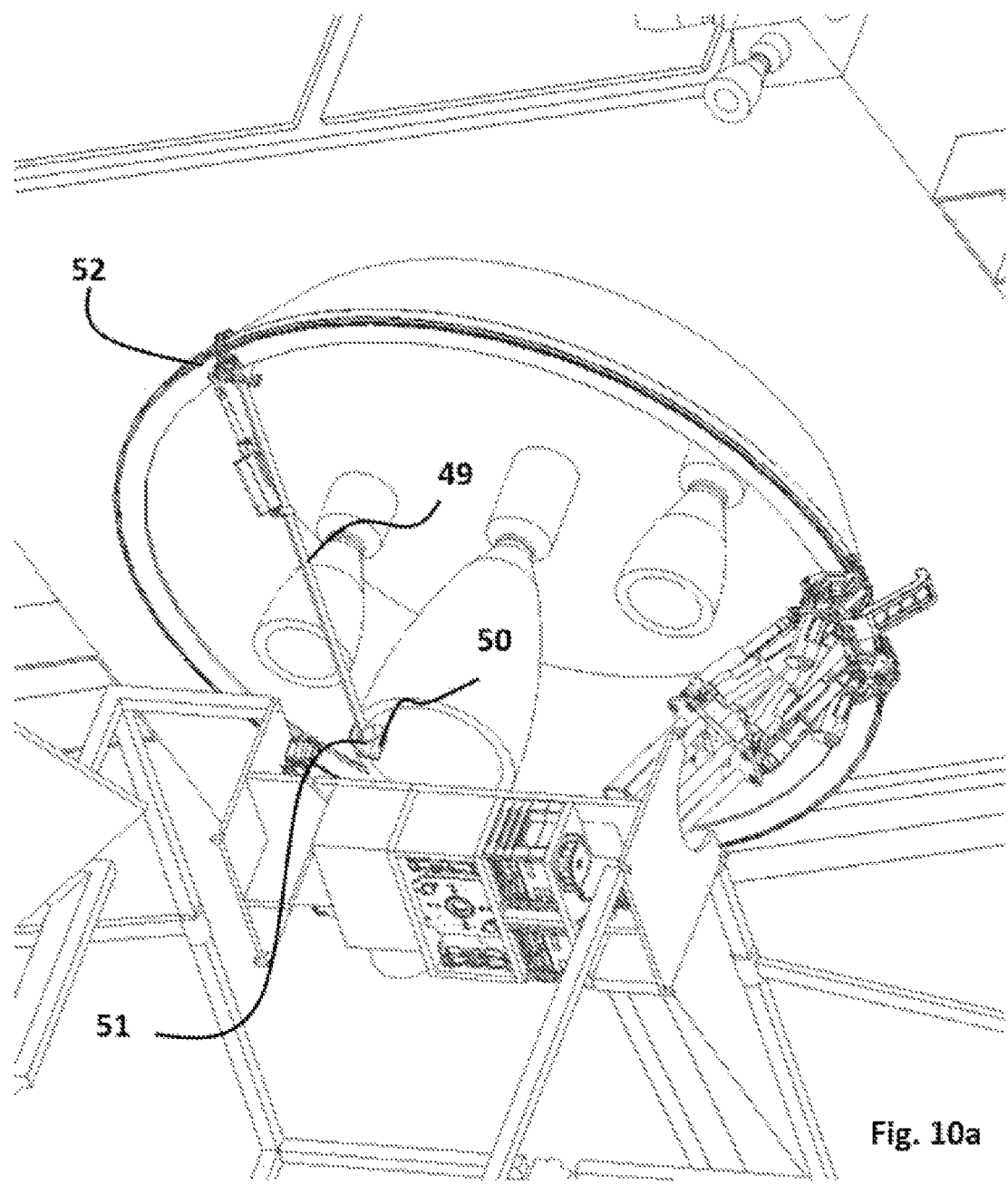

FIG. 10a shows a close up of the stabilised stack, whereas two additional single DOF arms have been deployed from the servicer towards the client LAR, in order to secure the connection between the 2 vessels.

Figure 11A:
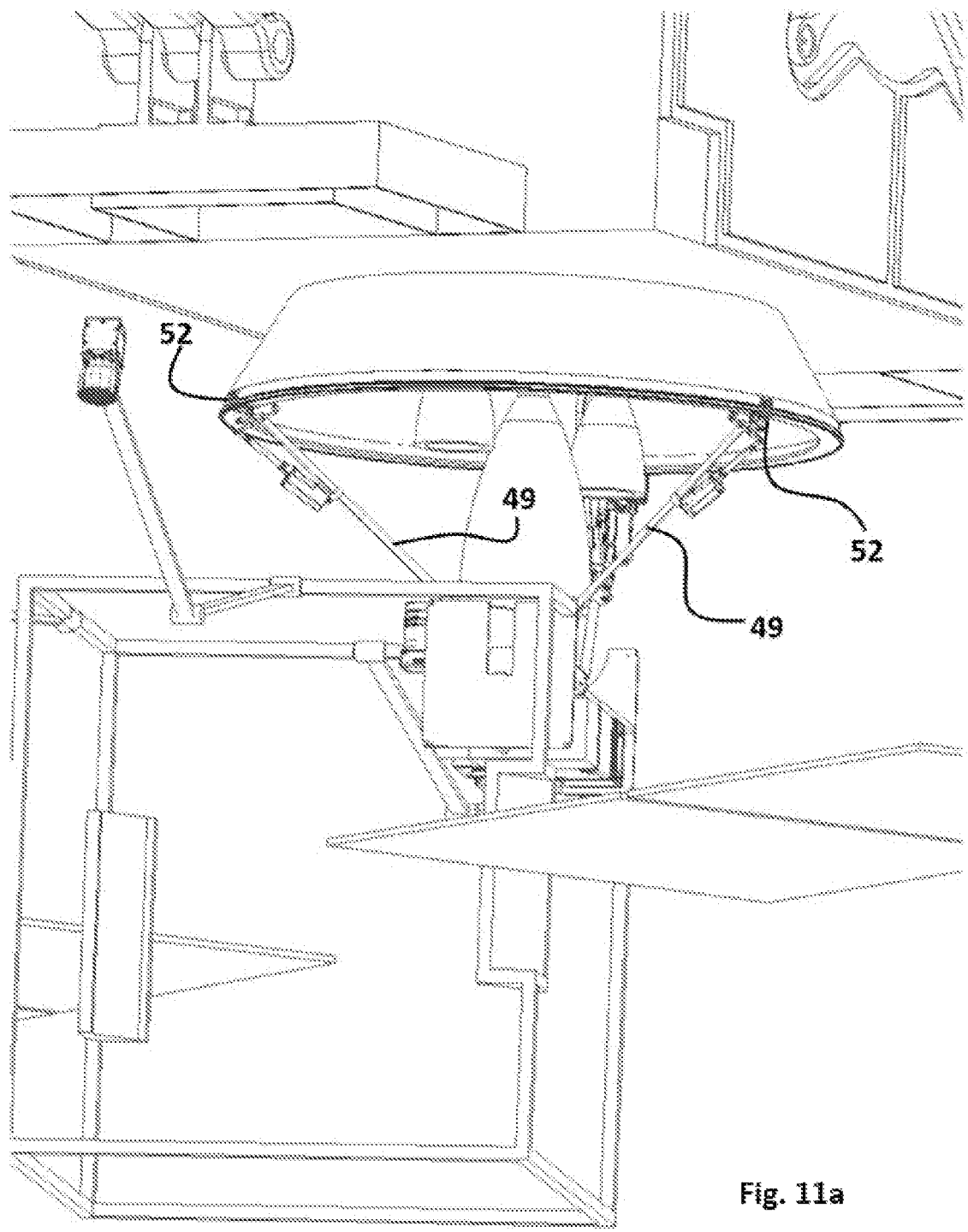

FIG. 11a shows the deployment of the additional single DOF arms from the other side, which are positioned on the LAR periphery, for the achievement of fully rigid docking in roughly 120 degrees intervals on the LAR periphery.

Figure 11B:
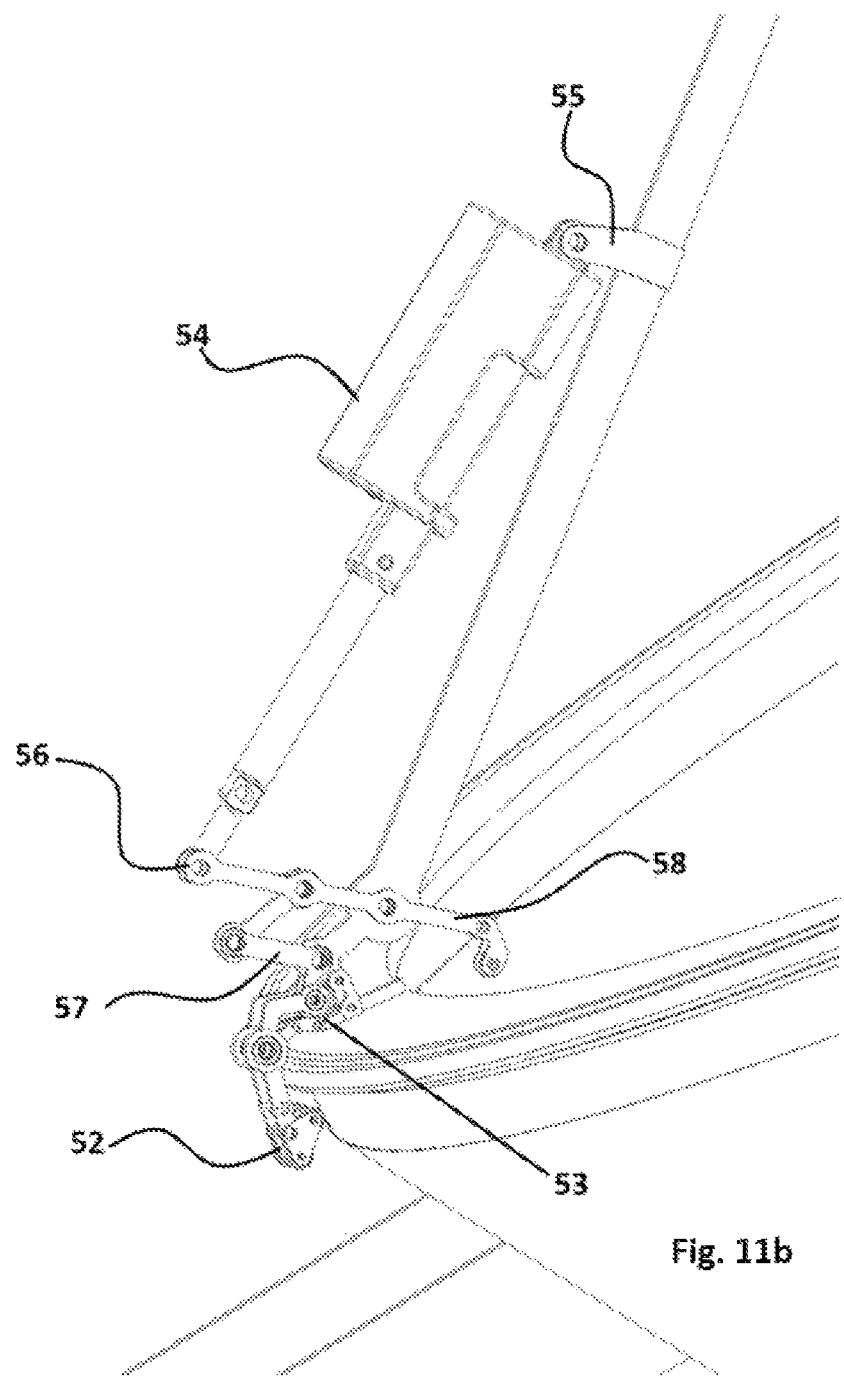

FIG. 11b shows the detailed view of the additional arm locks on the LAR, using simple, one DOF clamps tailored for the specific LAR design.

Figure 11C:
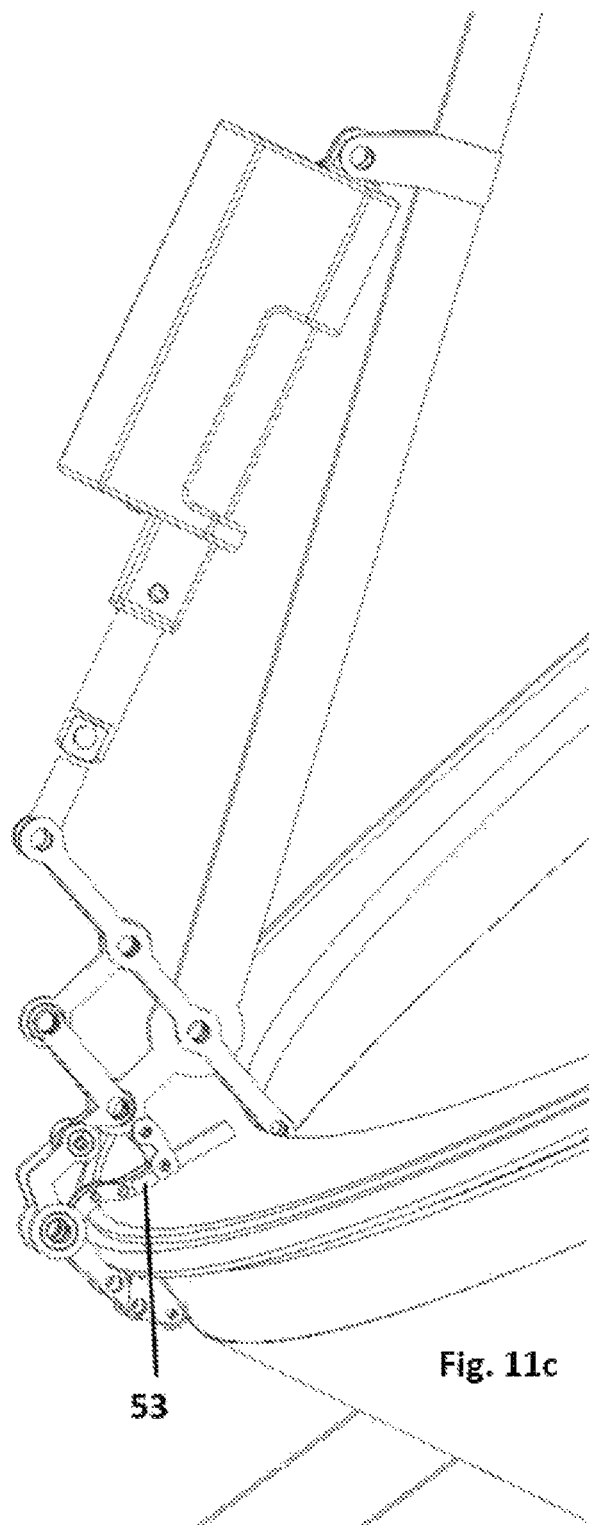

FIG. 11c shows the detailed view of the additional arm locks, activated by single DOF linear actuators, having locked on the target LAR of the client.

Figure 11D:
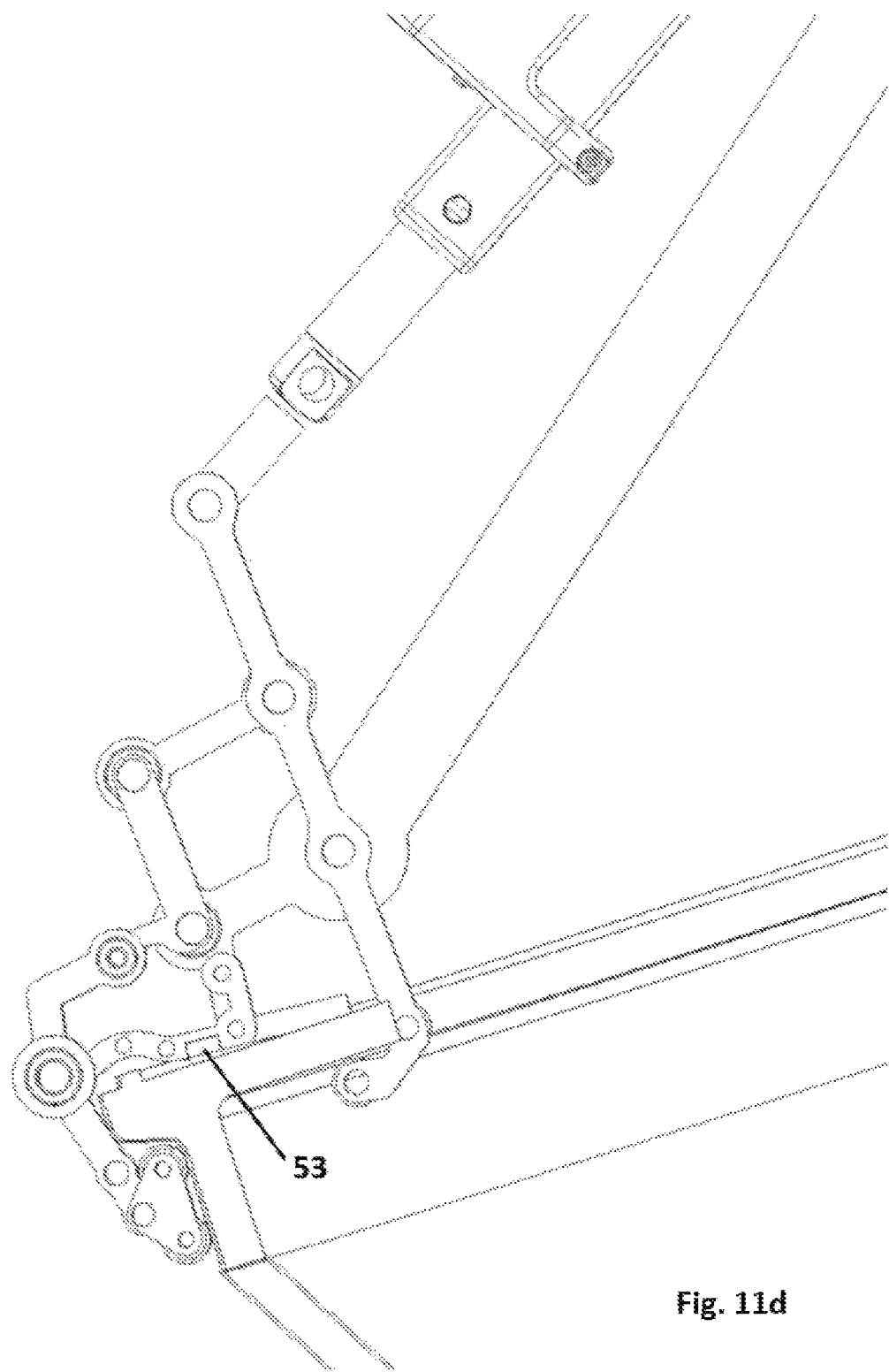

FIG. 11d shows the side view detail of the additional arm clamp, locked on the LAR section.

Figure 12A:
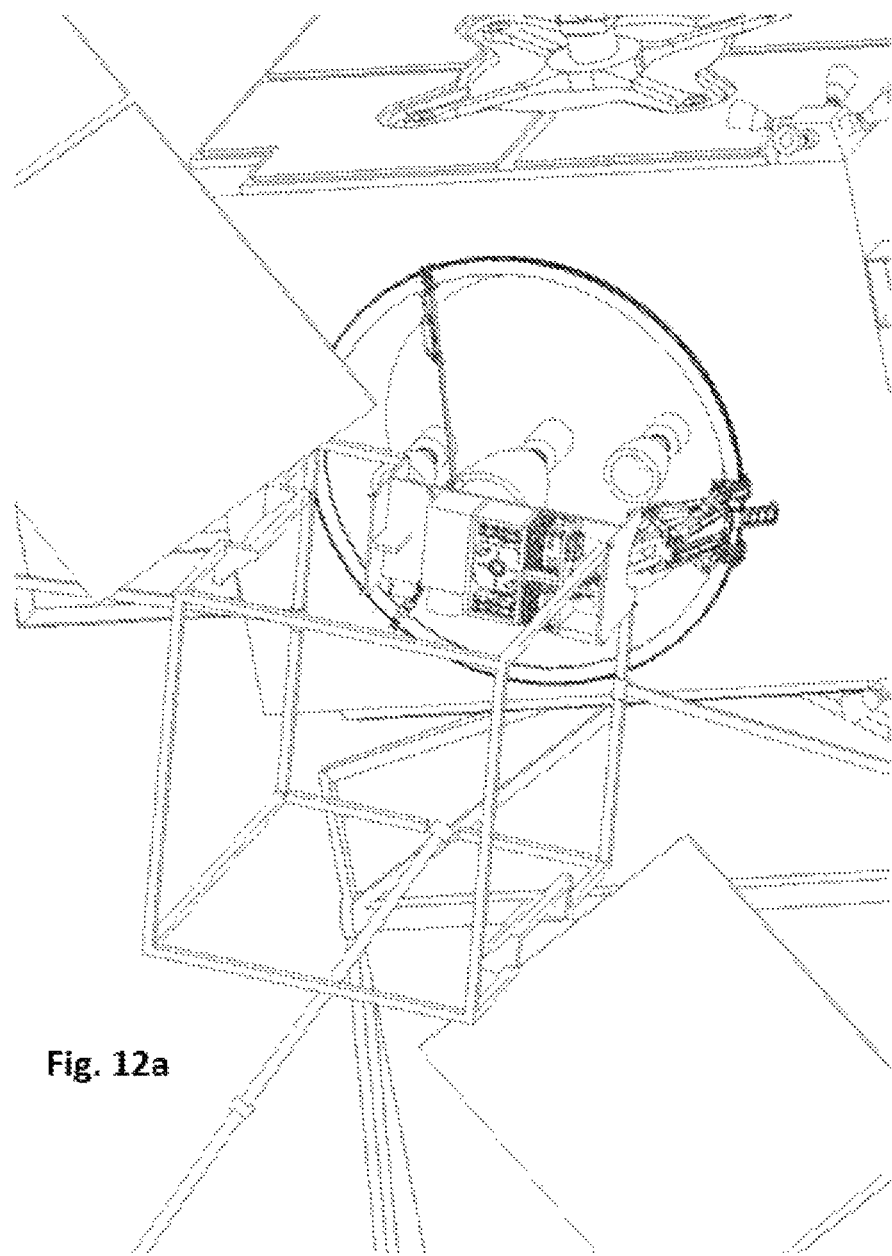

FIG. 12a shows the rigid stack of the servicer and client as seen from behind the servicer, with the 3 holding locations at roughly 120 degrees intervals.

Figure 12B:
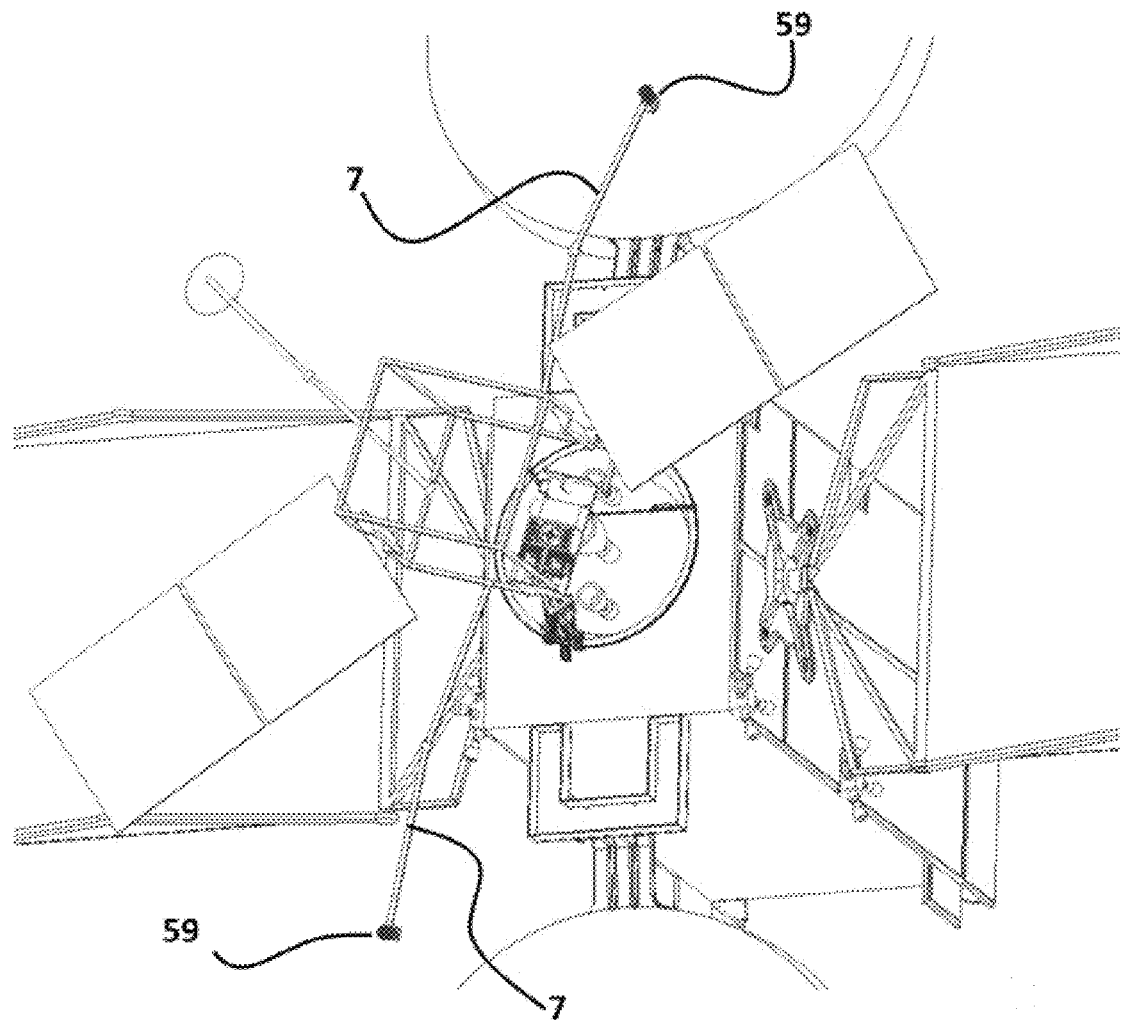

FIG. 12b shows the two vessels with the servicer and its station keeping thrusters vectors deployed and passing through the Center of gravity (CoG) of the stack.

Figure 12C:
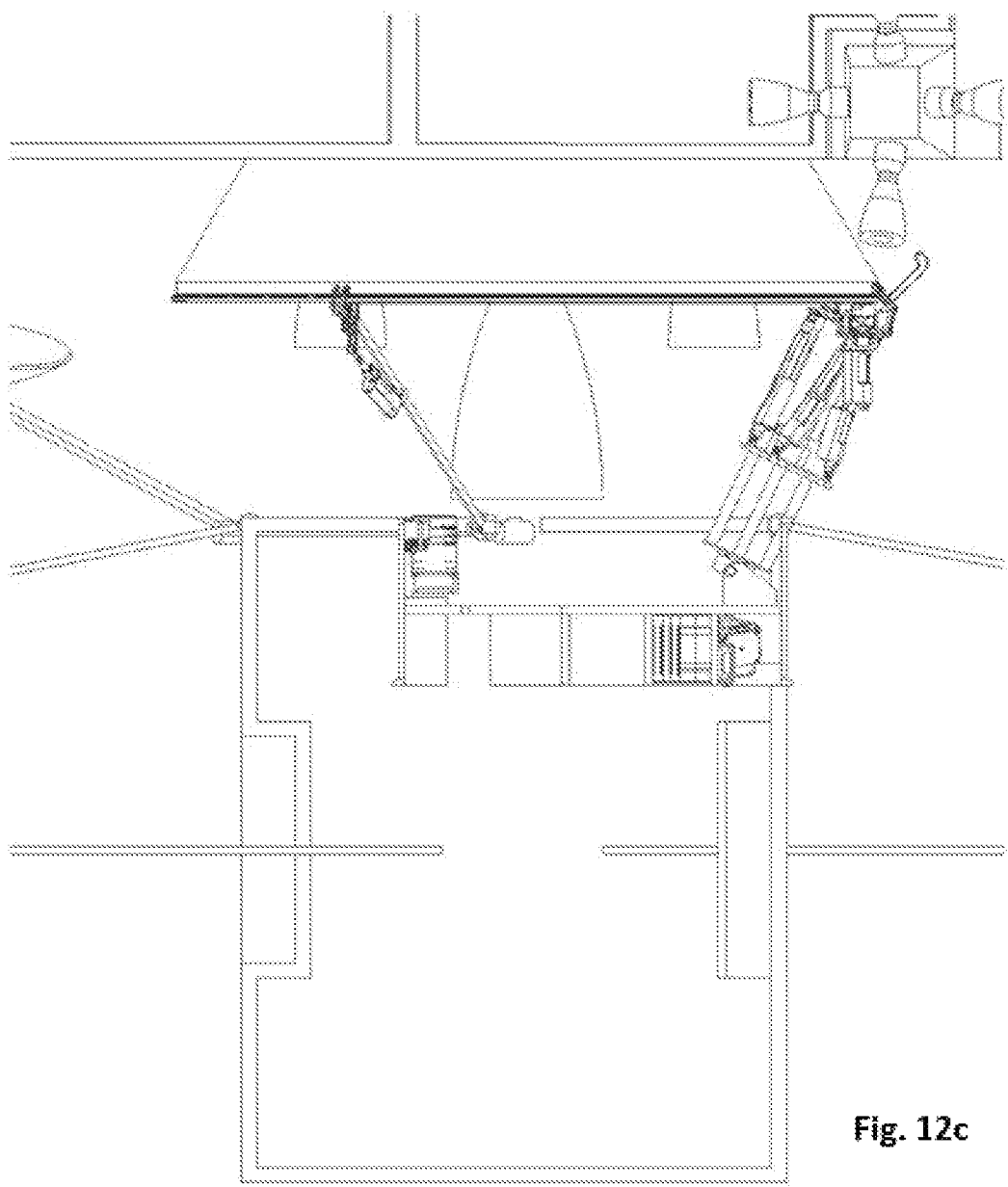

FIG. 12c shows a top view of the stack were the servicer can be seen holding the LAR of the client at small distance from the client's main thrusters.

Figure 12D:
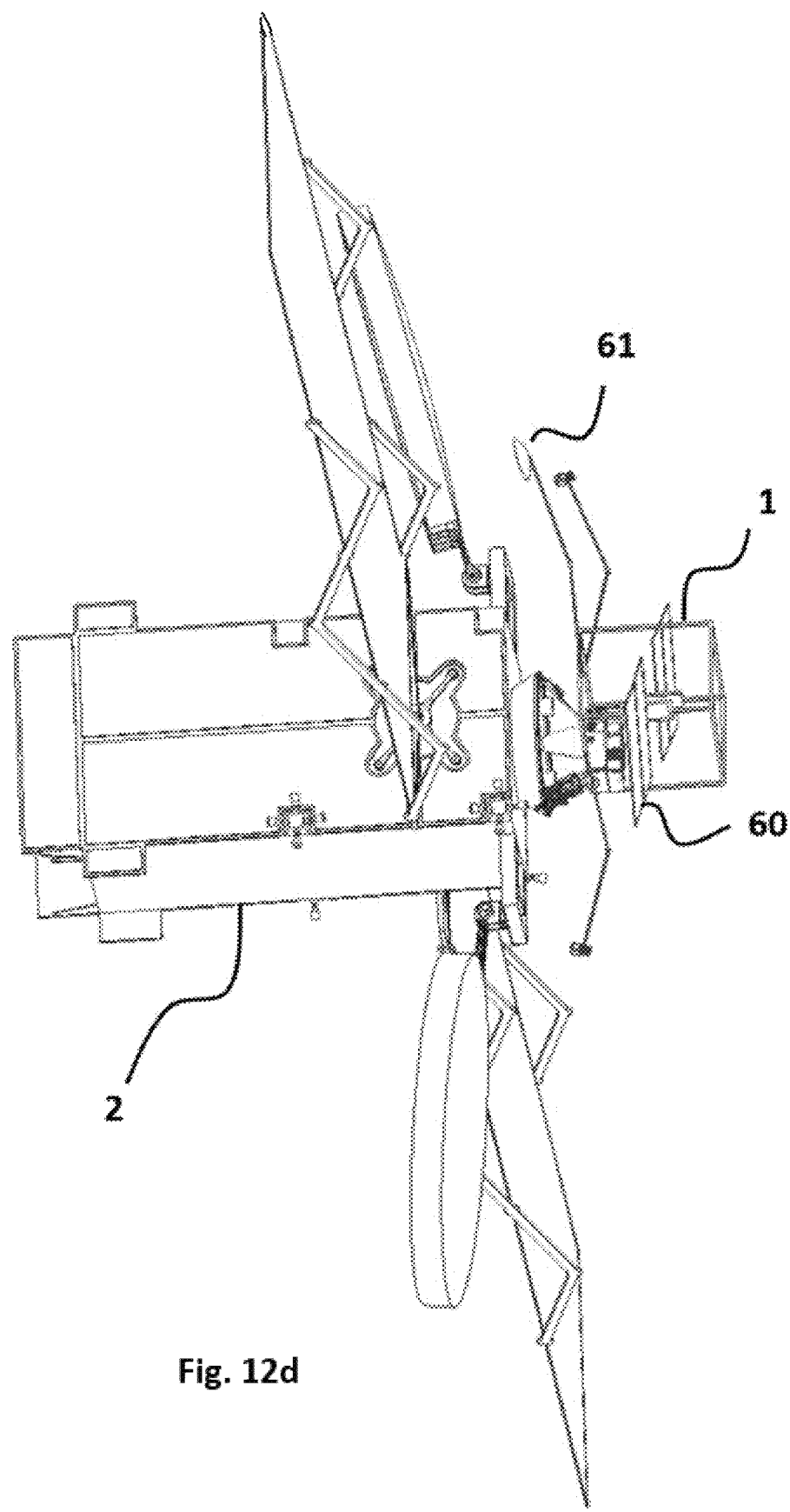

FIG. 12d shows a side view of the stack

Figure 12E:
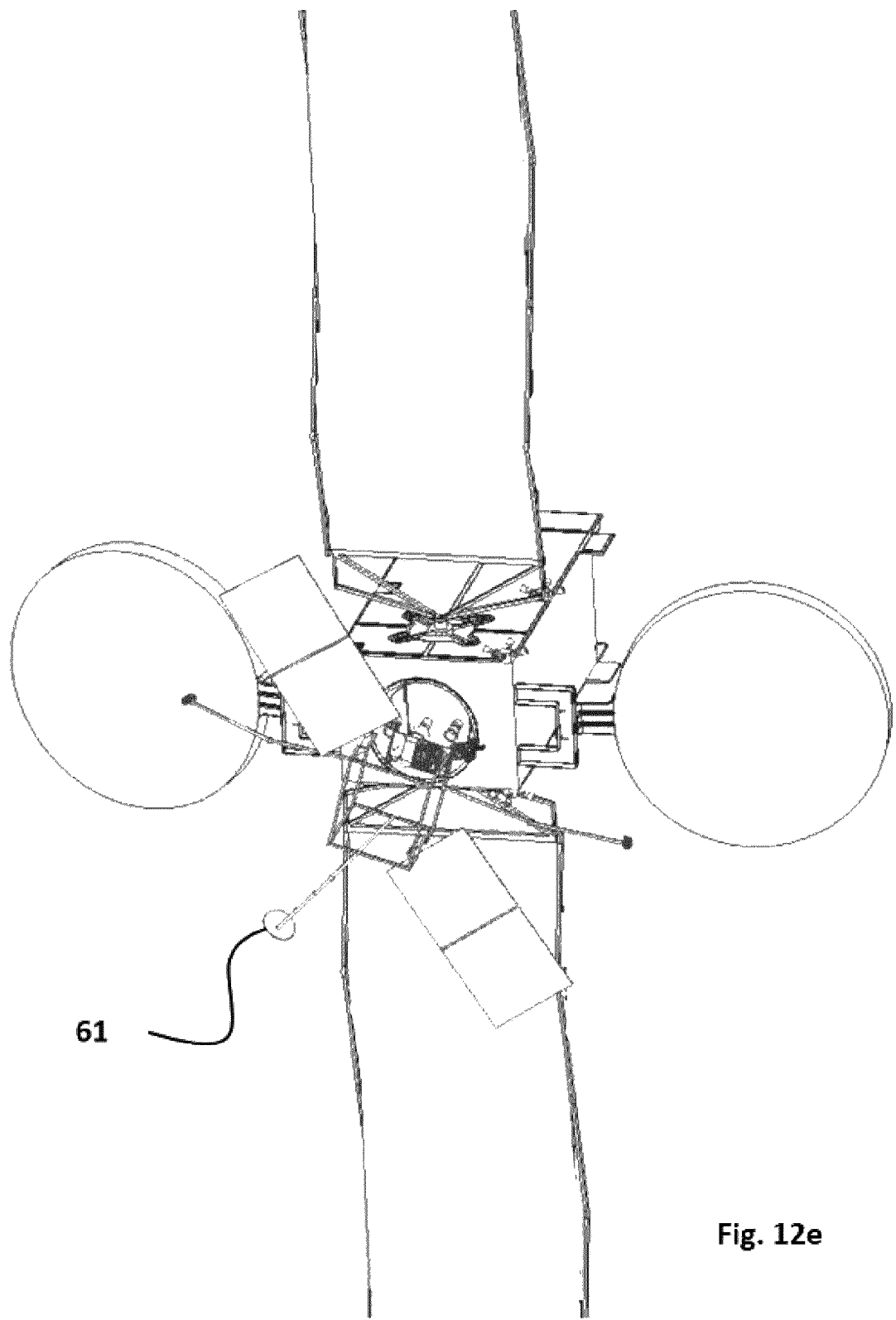

FIG. 12e shows a rear view of the 2 spacecraft rigidly connected with the deployed station keeping arms, carrying the thrusters for the station keeping function as well as the K band antenna of the servicer not being obstructed by the antennas and panels of the client.

6. DETAILED DESCRIPTION OF THE PRESENT INVENTION

In accordance with the invention, we provide a system for docking on a target satellite, in view to extend its useful life, or to modify its orbital slot or de-orbit it. The system comprises a servicer spacecraft which is used to form a docked satellite-spacecraft combination. The servicer spacecraft includes docking means for mechanically connecting to the target client satellite and form the docked satellite-spacecraft combination, with guidance, navigation and control systems and an onboard propellant supply. The guidance, navigation and control systems of the servicer spacecraft include systems for accomplishing rendezvous and control the docking process of the servicer spacecraft with the target satellite and for controlling the position of the docked satellite-spacecraft combination. The onboard propellant supply is sufficient to provide for rendezvous and docking of the spacecraft with the satellite and for position control of the docked satellite-spacecraft combination.

Figure 1:
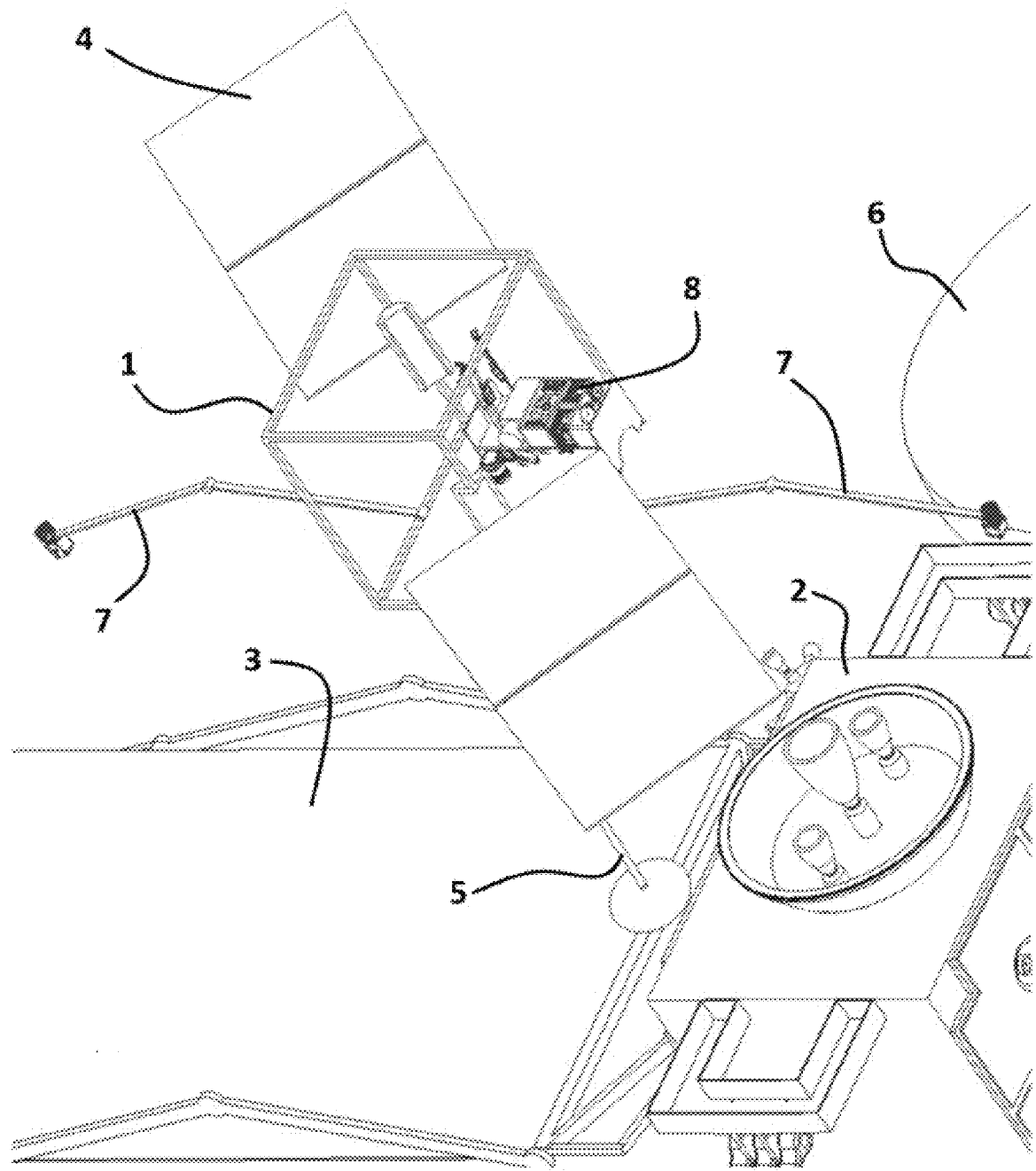
FIG. 1 is a perspective view of a servicer extension spacecraft, configured in accordance with a presently preferred embodiment of the invention, with the docking system fully retracted, approaching a client spacecraft for docking. In this case, a typical geo-stationary satellite representation of the client spacecraft is presented.

In the drawings, FIG. 1 illustrates a servicer spacecraft constructed and used in accordance with the principles of the present invention. The spacecraft 1 embodies a construction adapted to be carried into space, e.g., to a rendezvous phasing orbit or low earth orbit in the enclosed cargo bay or within the enclosing shroud of an earth launch vehicle, depending on mission requirements, availability, cost, etc. The service spacecraft is shown here in rendezvous on the geosynchronous orbit, approaching a large geo-synchronous communications satellite client 2 such as Optus. The approach is made from the side opposing the Earth-facing side of the satellite 2, targeting the launch adapter ring (LAR) of the client 2. The servicer vessel 1 is assumed to approach the desired location for the initiation of the docking procedure with a precision of +/−25 cm, that is within a cube of 50 cm of side. The approach distance between the vessels is assumed to be +/−1 m. The angular alignment error of the approach is assumed to be +/−2 degrees. The client vessel has various elements, such as solar panels 3 extending several m distances from its sides, or antenna reflectors 6 extending several m distances from its other sides. The servicer module 1 does not interfere with these elements. The servicer module is assumed here having the dimensions of a cube with 0.8 m per side. It is equipped with solar panels 4 extending from its sides and is further equipped with a K-band antenna 5 facing Earth as well as a pair of thrusters 7 mounted on light arms for station keeping of the stack, post docking. The servicer contains a smaller volume 8, integrated within its structure, where the docking system is retracted during the voyage towards the rendezvous.

Figure 2:
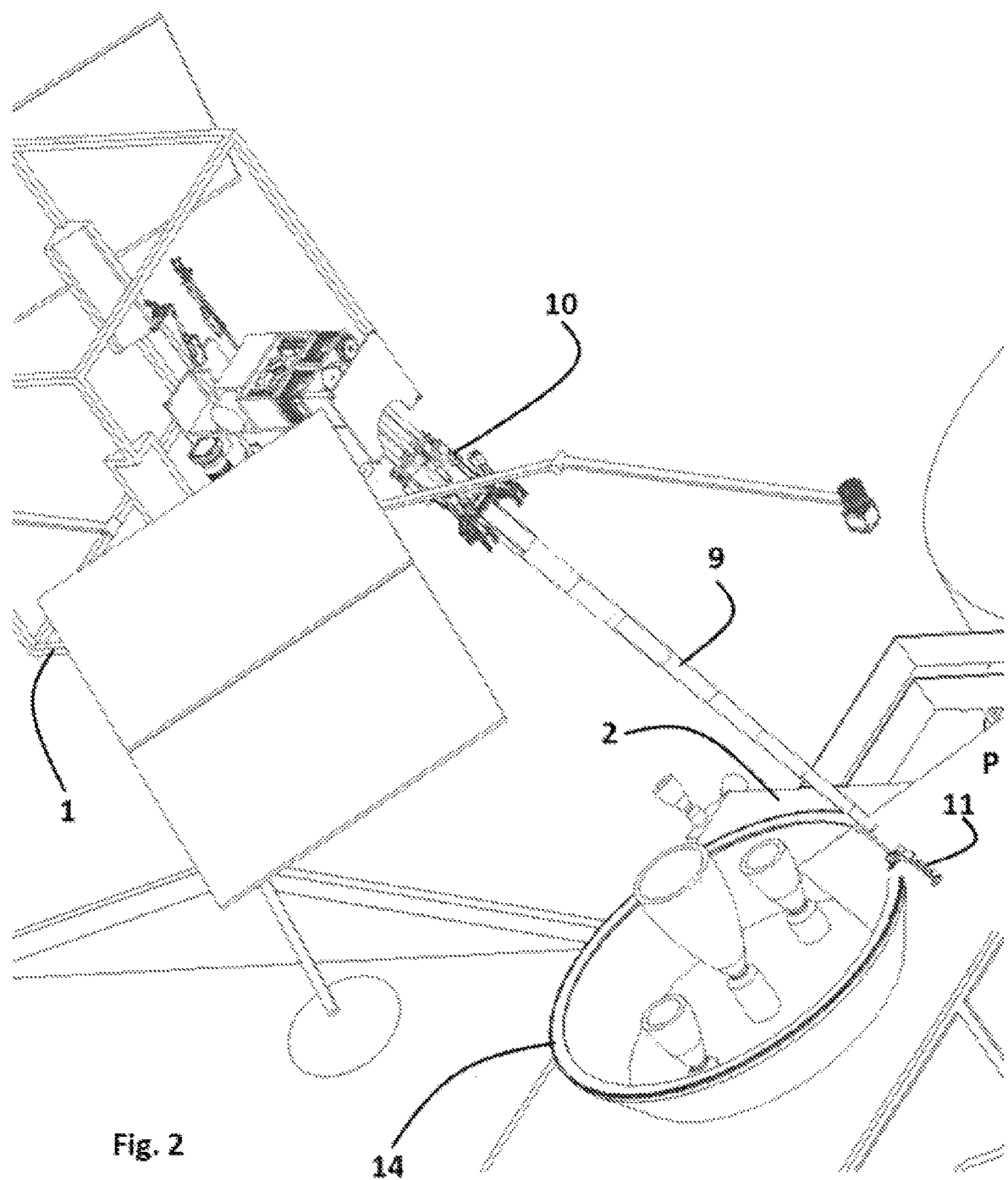
FIG. 2 is presenting the deployed Stewart platform of the servicer spacecraft and the deployed telescopic arm mounted on the end effector of said Stewart platform.
Figure 2A:
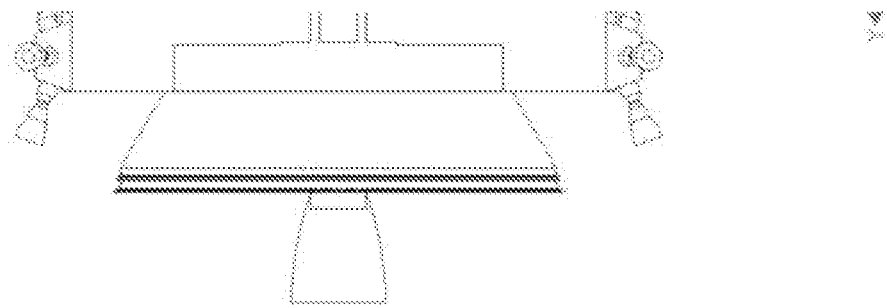
FIG. 2a is presenting a side view of the deployed Stewart platform of the servicer spacecraft and the actuator deploying the said Stewart platform on the servicer spacecraft.
Figure 2A:
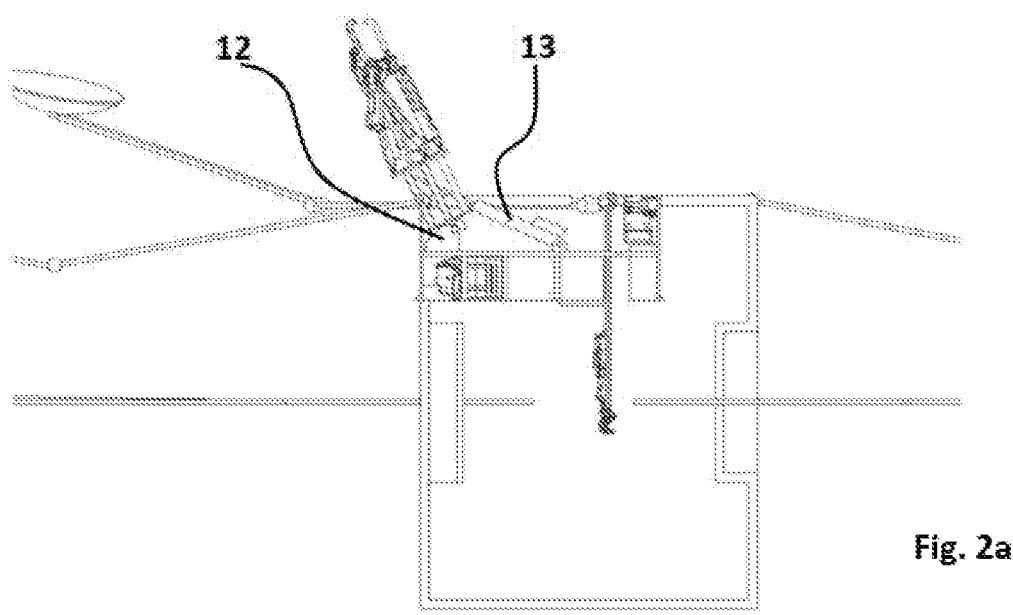

In FIG. 2, the servicer has deployed the docking system composed from a parallel six-DOF manipulator 10 (also known as Stewart platform) and a telescopic extendable arm 9, mounted on the end-effector plate of the Stewart platform (SP). A proposed deployment method for the Stewart platform is shown on FIG. 2a, where the platform rotates around a stationary hinge 12 and locks in deployed position through the use of a single degree of freedom linear actuator 13.

Figure 5:
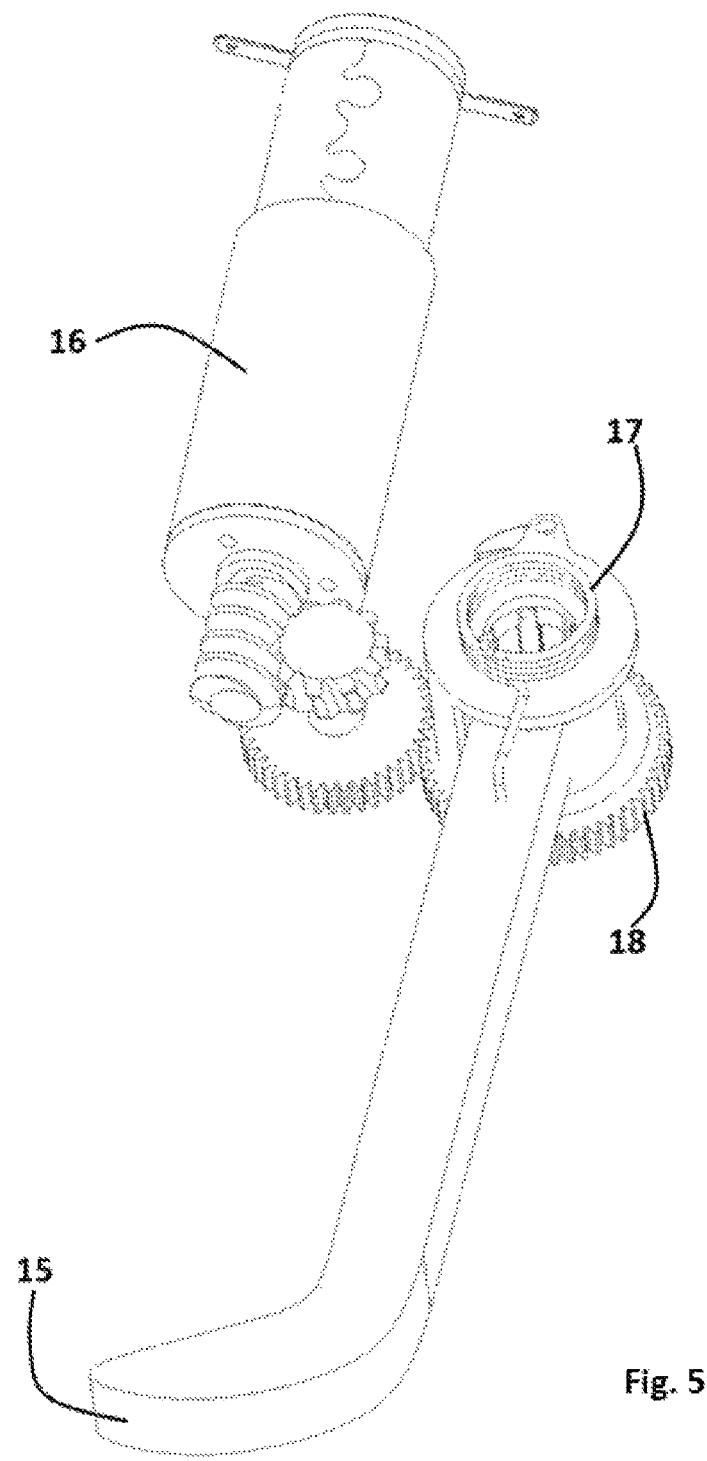
Figure 5A:
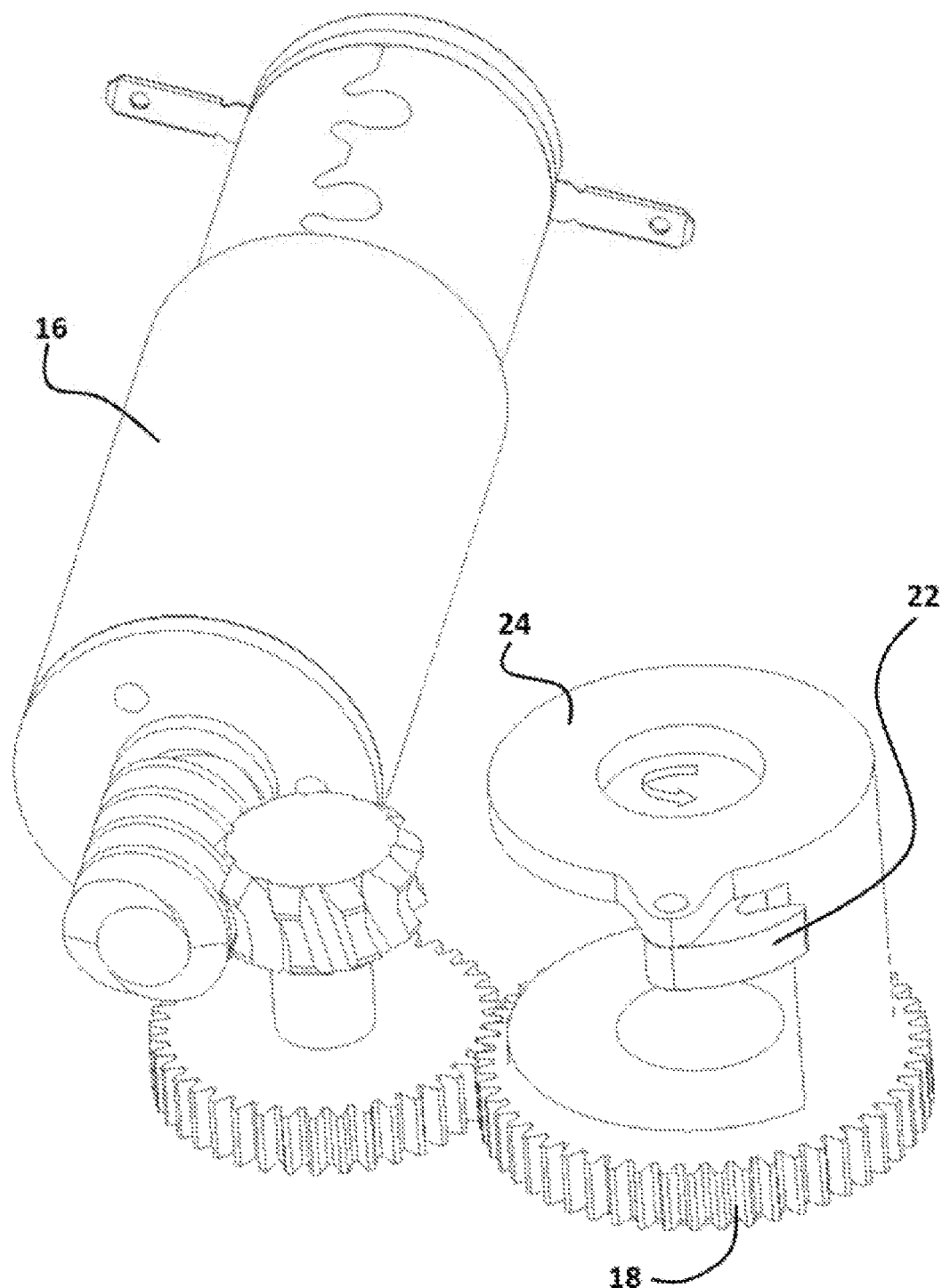
Figure 5B:
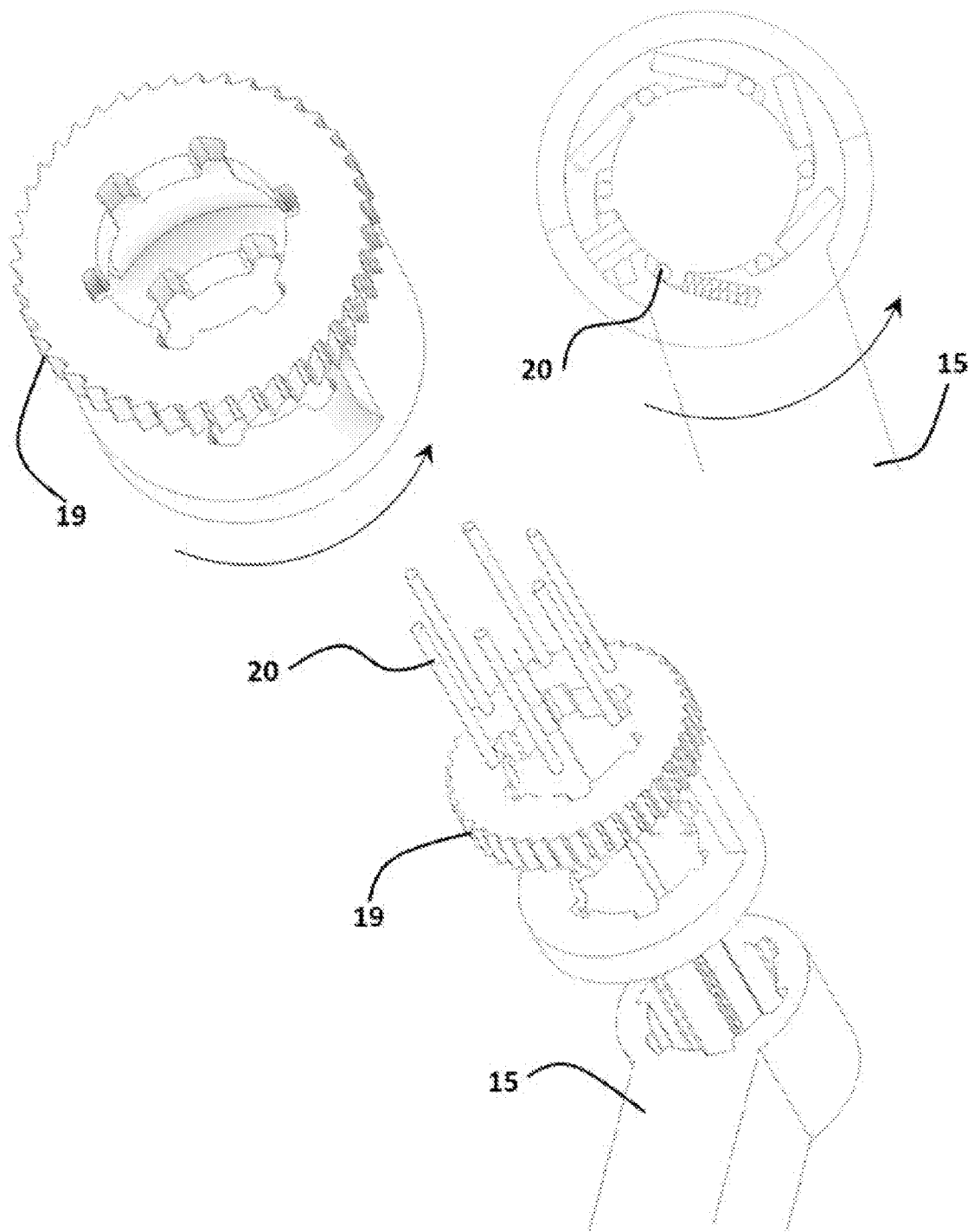
Figure 5C:
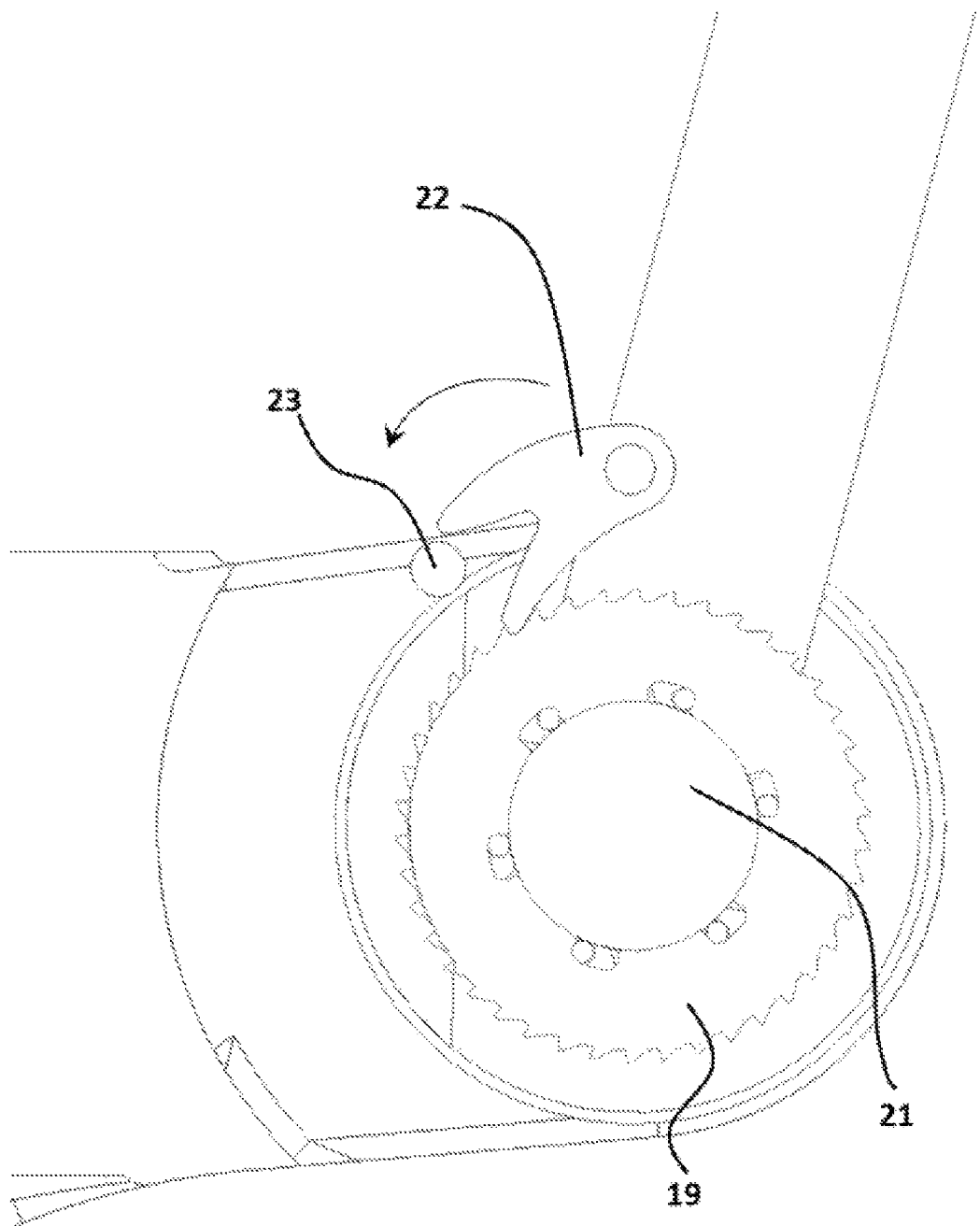
Figure 5D:
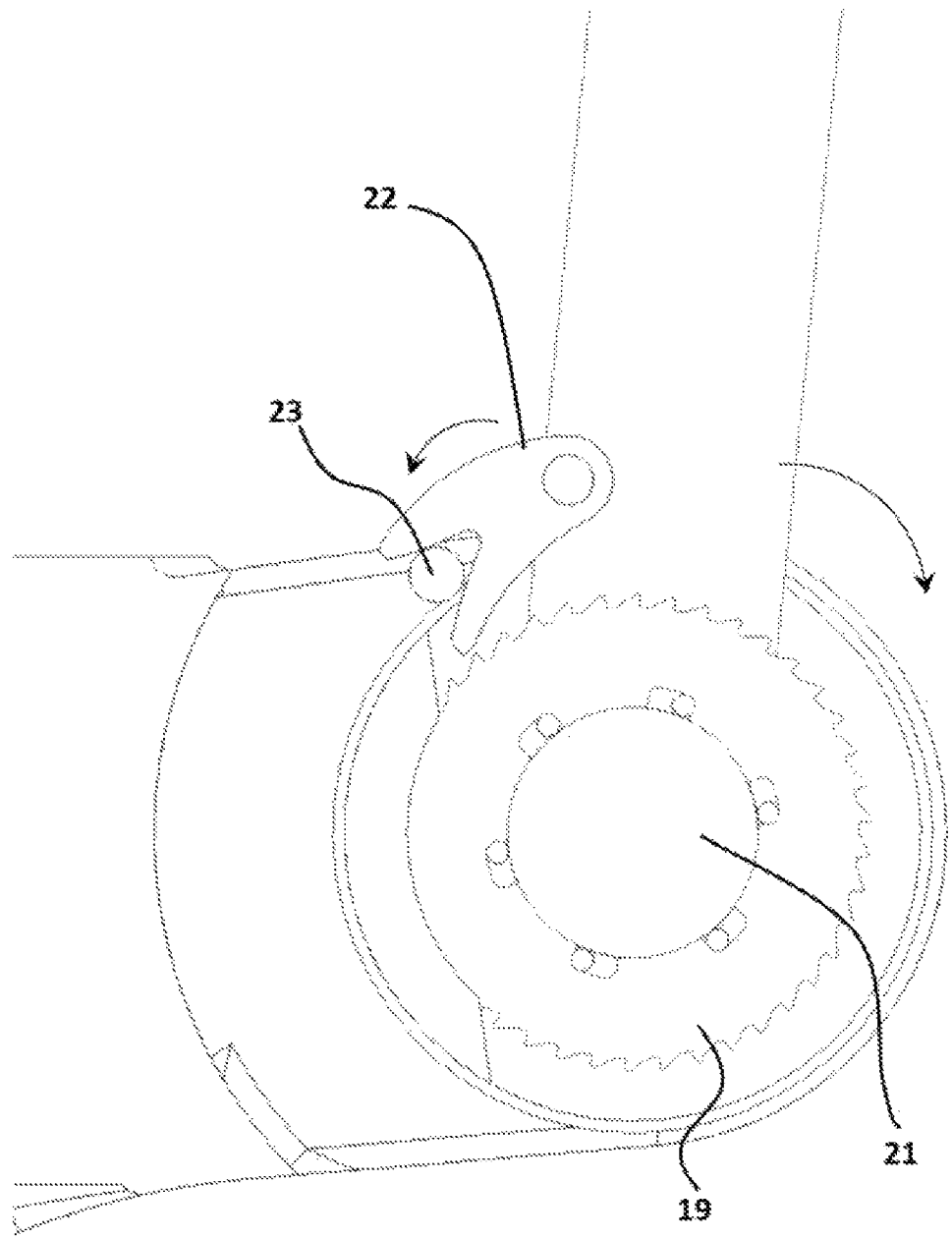
Figure 5E:
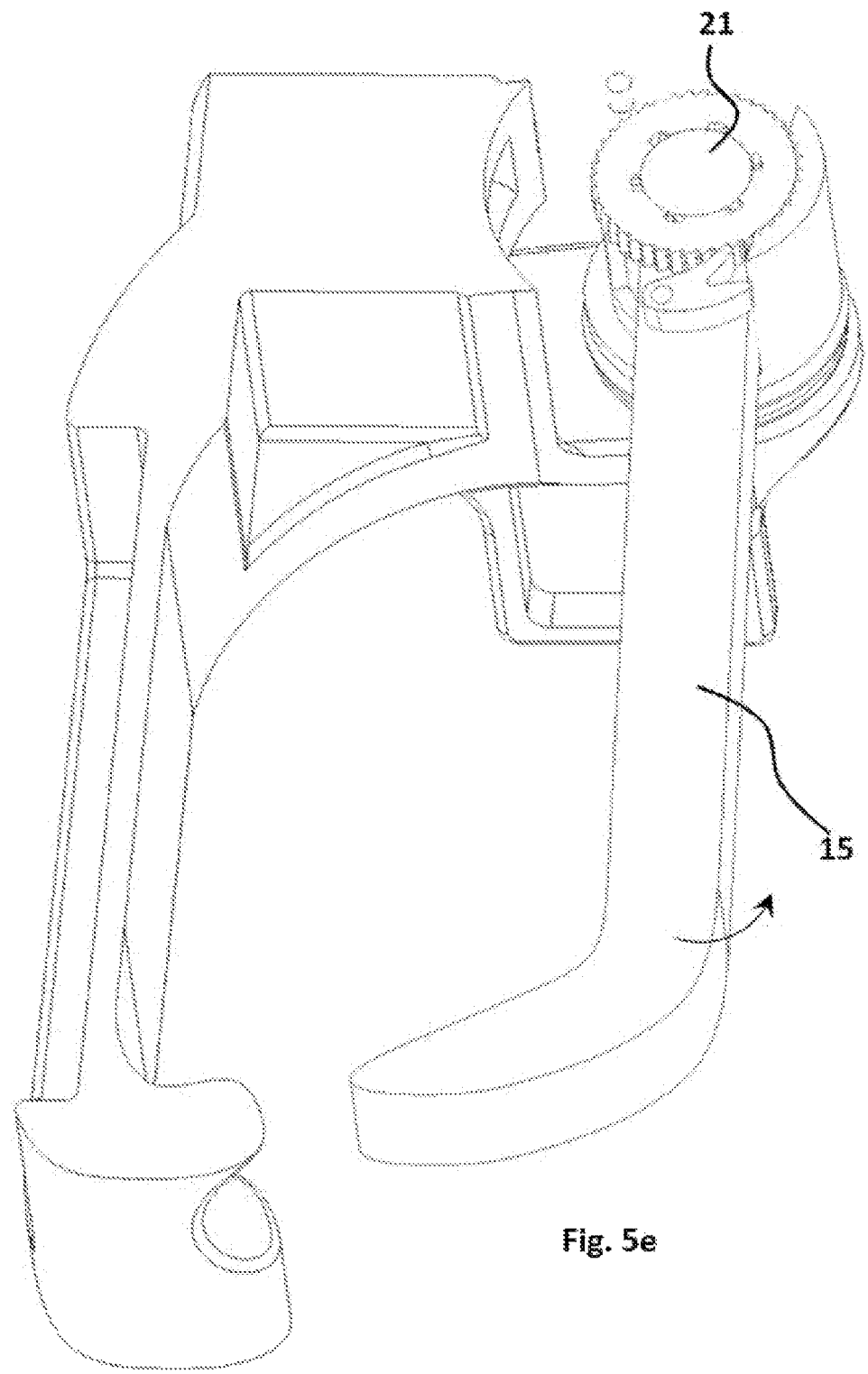
Figure 5F:
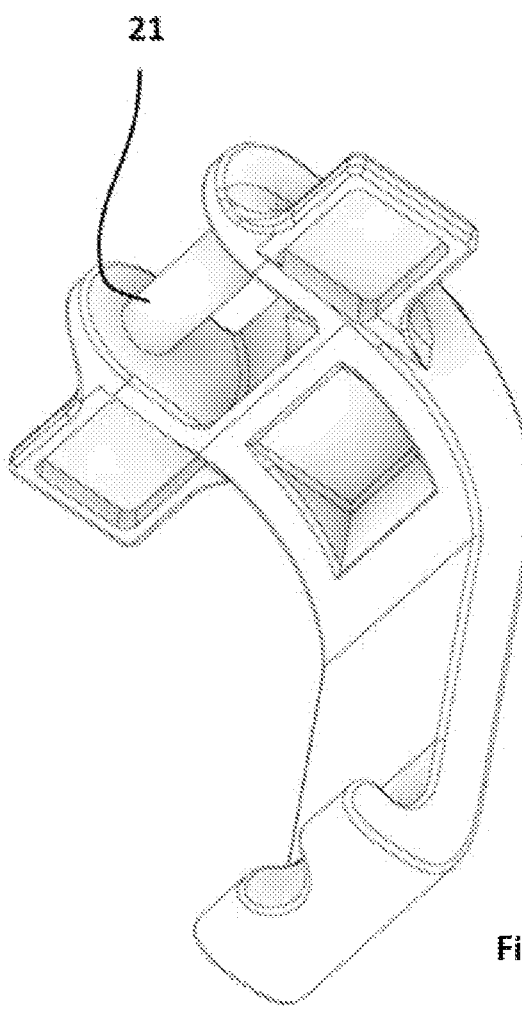

The telescopic arm 9 is then slowly extended towards the target LAR, initially aiming at estimating the exact distance between the 2 vessels. This is done with the help of proximity sensors, mounted on the pincher 11 of the arm 9. The detailed proposed arrangement of the pincher 11 is shown on FIG. 3a. A number of optical proximity sensors S1 S2 S3 S4 S5 S6 such as those operating based on the time of flight principle, as the GY-VL53LOXV2 Time-of-Flight Distance Sensor chips, are placed on the pincher. Adequate shielding is used to protect the chips from radiation, while sapphire crystals protect the chip slots needed for light emission and reception. The sensors S1 S2 S3 S4 aim at a direction orthogonal to the axis of extension of the telescopic arm as shown on FIG. 3a. Sensors S5 S6 face towards the axial deployment direction of the arm (FIGS. 3a and 3b). The typical range of these sensors is 0-50 cm. When the telescopic arm is directly deployed towards the target vessel and the distance from the pincher becomes smaller than 50 cm, the sensors S5 S6 are expected to provide some readings. Given the fact that the length of the deployed telescopic arm 9 is known at all times, (details on the telescopic arm deployment follow), these values are used to estimate the distance between the 2 vessels with the accuracy of a few cm. Then, the arm 9 is made to swing towards the upper side of the LAR as seen from the servicer's side, reaching far beyond the periphery of the target LAR, as shown on FIG. 2. This is done in order to prepare for the swing motion of the telescopic arm, targeting the LAR. At this remote location 250 the telescopic arm is extended at a distance approaching the measured distance of the two vessels, minus the height of the targeted protruding surface, in this case the LAR. The SP then rotates the arm 9 holding the pincher around its own extension axis, in a way that the motion of the digit 15 of the pincher (shown on FIG. 3a) operates on the same plane as the motion of the SP moving towards the LAR (operational plane P as shown on FIG. 2, defined as the plane containing the telescopic arm with the pincher and the orthogonal direction of measurement of the S1 S2 S3 S4 proximity sensors). The SP then slowly swings the telescopic arm 9 until some reading is obtained on a least one of the S1 S2 S3 S4 sensors, meaning that the pincher is close enough to start facing the surface of the target LAR. FIG. 3c presents a side view of this situation. In this figure, the arm approaches the target LAR 14 but the length of the arm is too long for the pincher to operate correctly. This is detected from the readings from sensors S1 S2 S3 S4. The sensors provide measurements roughly equal, indicating that the pincher has not yet arrived close to the edge of the LAR. The role of this operation is therefore to correctly detect the edge of the LAR. By slowly decreasing the length of the telescopic arm, this can be achieved with sufficient precision. This is shown on FIG. 3d. In this case, sensors S3 and S4 may provide small measurements of 2-5 cm, but sensor S1 and possibly S2 provide measurements of 40 cm or more. Additionally, at this point the sensors S5 S6 also provide measurements, in the order of a few cm, since they face the frontal surface of the LAR. The above conditions indicate that the pincher is at the proximity of an edge, which is presumably the edge of the LAR. In this case the pincher can be launched to close its digit 15, grasping the target surface. The grasping operation is very rapid, due to the use of a spring for closing digit 15 (details follow). FIG. 4a shows a close up of the grasped LAR with digit 15 closed. FIG. 4b shows an overview of the 2 vessels with the telescopic arm and the SP in grasping position. Rapid grasping is needed especially in the case the target vessel is tumbling. In such situation, the approach of the telescopic arm is done in a similar way in order to initially estimate the distance between the 2 vessels, at the best possible grasping conditions. Although the chaser is positioned at a distance of around 1 m from the target, this distance may vary with the tumbling motion. The telescopic arm is therefore again used for approaching more the target and producing a series of measurements indicating the distance variation between the 2 vessels due to tumbling motion of the target. If the measured distance varies with tumbling, an average distance can be derived. The arm is then made to swing towards the upper side of the LAR, as seen from the servicer, reaching far beyond the periphery of the target LAR, as shown on FIG. 2. This is done in order to prepare for the swing motion of the telescopic arm, targeting the LAR. At this remote location, the telescopic arm is extended at a distance approaching the average measured distance of the two vessels, minus the height of the targeted protruding surface, in this case the LAR. The SP then rotates the arm 9 holding the pincher around its own extension axis, in a way that the motion of the digit 15 of the pincher operates on the same plane as the motion of the SP moving towards the LAR (operational plane P as shown on FIG. 2). The arm 9 is then moved towards the targeted tumbling LAR very slowly, with the S1 S2 S3 S4 proximity sensors providing readings of the distances measured and in this way providing information to build a history of measurements of the distances measured during the tumbling motion of the target. Through slow adaptation of the telescopic arm length and swing angle and observation of the measurements, the system then can be made to approach the tumbling LAR without ever entering within its tumbling range of motion (therefore without ever risking a collision), until the periodic measurements obtained indicate that there is a (possibly short) period during the LAR motion that the pincher is in adequate location for grasping (i.e. with the measurements of the S3 S4 sensors close to 2-5 cm, the readings of the S1 S2 much higher and the readings of S5 S6 also close to 2-5 cm). If such conditions are met at least once during the periodic tumbling cycle of the target, the grasping operation is enabled. The next time the conditions are met, the pincher closes. FIG. 5 shows the details of the mechanism proposed for the rapid operation of the digit of the pincher for rapid grasping. The capturing digit 15 is shown with the fast return spring 17 mounted in a way to push the digit to close. The opening of the digit 15 is operated by motor 16 and gear 18. FIG. 5a shows the assembly used for the opening of the pincher. The motor 16 generates the motion of gear 18, which forms a block with plate 24, on which the nail 22 is mounted. For the operation of the opening of digit 15, the motor rotates in a way to engage gear 18 in counter clockwise rotation as shown on FIG. 5a. The block 24 carrying the nail 22 engages then the toothed wheel 19 (FIG. 5c), pushing the digit to rotate counter-clockwise. The assembly of the toothed wheel 19 and the digit 15 are shown in FIG. 5b, comprising: the toothed wheel 19 which comprises 6 enclaves for the rollers 20, which engage the digit 15 through similar but inclined enclaves. The rollers operate on the surface of inner axis 21, which is fixed on the pincher body (FIG. 5f). The counter-clockwise rotation of the digit (FIG. 5b) pushes the needles 20 towards the narrow part of the enclaves of digit 15, where the rollers are also pushed by springs, blocking the rollers against the surface of the axis 21, in a way to block the counter-clockwise rotation of the digit 15. This preserves the digit 15 from opening when an external force is exercised on the digit 15. However, when a counter-clockwise rotation is applied on the wheel 19 (under the effect of the nail 22), as shown on FIG. 5b, the enclaves of the wheel 19 push the needles 20 off the narrow parts of the enclaves of the digit 15 and against the springs, permitting to the wheel and digit to rotate counter-clockwise on axis 21. The mechanism therefore prevents the forced opening of the digit when it is closed by forces applied on the digit itself, but allows the opening of the digit through the rotation of the toothed wheel 19 of the mechanism. For the arming of the mechanism, the motor operates the gear 18 counter-clockwise, as shown on FIG. 5a. The wheel 19 is engaged by the nail 22. The rotation of plate 24 drives the nail 22, rotating the toothed wheel 19 and the digit counter-clockwise as shown on FIG. 5c. This motion constitutes the arming of the pincher to launching position. The motion of the motor stops at the location as shown on FIG. 5c, a little before the nail 22 enters in contact with pin 23, through the use of an electric switch (not shown for simplicity), stopping the motor just before nail 22 is engaged in pin 23. When the motor rotates further counter-clockwise for 2-3 degrees, the block 24 carrying the nail 22 (as shown on FIG. 5d), finds the pin 23 which engages in the nail, forcing it to release the toothed wheel 19. At this moment, under the effect of spring 17, the digit 15 quickly snaps clock-wise as shown on FIG. 5 and performs a rapid pincher grasping. When the digit is at this closed position, as shown on FIG. 5e, any forces developed due to relative motion of the 2 vessels that tend to open the digit 15 (that is, rotate it counter-clockwise as shown on FIG. 5e), are met by the resistance developed in the uni-directional mechanism composed by the rollers 20 as shown on FIG. 5b. A slight rotation of the digit counter-clockwise by 2-4 degrees, engages the rollers on the axis 21 which is fixed on the body of the pincher as shown on FIG. 5f, forcing the digit to stop. For the opening of the digit, gear 18 and the block 24 return clock-wise to their initial position and the nail 22 re-engages the wheel 19. Then, the group starts rotating again counter-clockwise carrying the digit 15 to open. FIG. 6 shows the preferred embodiment of the mechanism proposed for the deployment and retraction of the telescopic means. It consists of a coiled stem 25 made of a semi-circular blade of very thin metal, (such as those manufactured for example for deployable stems by Roll-A-Tube UK), which in this case is rolled around a motorised drum powered by motor and gearbox 26, which upon extension is forced to roll around rollers 27, 28 and 29, driven further through the opening of the base 32 holding the telescopic arm and extending as shown of FIG. 6a, pushing the passive protective cylinder segments 30 and 31 to extension. The described set of stem, rollers and motor are housed at the base of the telescopic means 32, shown on FIG. 6. The said deployable stem further carries a flat cable 33 as shown in detail on FIG. 6b that transmits power to the pincher and receives signals from the proximity sensors. This flat cable connects to a miniature slip ring 34, such as those commercialized by MOOG, permitting the collection of a number of signal and low power lines through a rotating contact. FIG. 6c presents the assembled telescopic arm semi-retracted, with the pincher 11 mounted on it.

FIG. 7 presents a side view of the two vessels with the telescopic means starting to retract, while the pincher 11 remains grasped on the target LAR of the client. During this operation the parallel manipulator as shown in detail on FIG. 7a, operates in hybrid position-force mode, on the basis of the measurements of the forces developed in the telescopic means 9 and transmitted through the end effector 37 of the SP towards the six actuators 35 of the SP mounted between the end effector plate 37 and the base of the platform 36 which rigidly connects to the chassis of the servicer spacecraft through the adaptor 40. These forces, generated either due to existing tumbling rates of the client vessel, or due to existing relative rates between the servicer and the client, or possibly due to small perturbations during the retraction of the telescopic means of the servicer, are measured along each of the actuators 35 with a special arrangement of their mounting positions on the end effector plate 37, as shown on FIGS. 7b and 7c. Furthermore, the two rigid clamps 38 are shown on FIG. 7a mounted on plate 37 of the SP, used for the full rigid capturing of the client LAR after the collapse of the telescopic means towards the static base 36 of the SP.

The special arrangement consists in plate 41 as shown on FIGS. 7b and 7c, which is rigidly connected on plate 37 in its middle and holds two actuators 35 on its extremities. The plate 41 is thinned purposively at a specific section and a force sensor element 42 as shown on FIG. 7c measures its deflection, when forces are generated in the actuators 35. The force sensor 42 is similar to the force sensing elements using strain gauges that are widely used for digital weighting scales. Since plate 41 holds the actuator 35 on one side and is rigidly fixed on the end effector of plate 37 of the SP on the other side, any force transmitted on the end effector through for example the telescopic means 9, passes through plate 41 towards the linear actuator 35. In that way, the sensor elements 42 are subject to torsional deformation and provide electric signals proportional to the force applied. These signals can then be used for the operation of the SP in hybrid force-position and force compliance mode. A hybrid force-position compliance mode consists in the actuators 35 being subject to a classic Proportional-Integrative-Derivative (PID) control loop regarding their linear position output, whereas in the case of Hybrid control loop this linear position output is also affected by the force sensed by sensor 42, in a method proposed by the present patent as follows:

feedback=(position error)*(position gain)+(measured force)*(force gain)+(Integral of position error)*(integral P gain)+(integral of force)*(integral F gain)+(Derivative of position error)*Derivative P gain)+(Derivative of force)*(Derivative F gain), Whereas:

"feedback" is the output of the power stage controlling the specific motor

"position error" is the error between the present linear position output and the reference position output "position gain" is the gain applied in the proportional part of the loop "integral of position error" is the integral of the position error in time "integral P gain" is the gain of the Integrative part of the loop "derivative of position error" is the derivative of the position error in time "derivative P gain" is the gain applied for the derivative part of the loop "measured force" is the force measured by the sensor, provided that at rest (with zero applied force) the force measured by the sensor is zero "force gain" is the gain applied on the proportional force part of the loop "integral of force" is the integration of the measured force in time "integral F gain" is the gain applied for the integral force part of the loop "derivative of force" is the derivative of measured force in time "derivative of force gain" is the gain applied for the derivative force part of the loop.

The proposed method in the context of the present patent consists in applying a position and force loop as shown above at each of the six linear actuators 35 of the SP, with the possibility to vary the aforementioned gains in the loop controlling each one of them, during the capturing process. The gain variation can be done by using a dedicated microcontroller supervising the motion of each of the said linear actuators. In one possible embodiment, the said actuator 35 can consist in a DC motor driving a ball-screw linear assembly, consisting of the output shaft of the actuator 35, while the position of the linear output shaft is measured by a potentiometer integrated in the mechanical structure. Such actuators are very common in the industry and are sold by many manufacturers, for example by Warner Electric. A commonly available micro controller such as an Arduino DUE can be used for monitoring the output of the linear position of the said actuator 35 as well as the output of the said sensor 42 (which usually operates using strain gauges mounted on a bridge-shaped structure and using a Whitestone bridge assembly to measure force-induced strain in the sensor, producing a very low current that needs to be amplified by widely available amplifier circuits such as those based on Analog Device chip AD623). The Arduino Due controller can be networked with several other similar controller devices, each one controlling a single linear actuator, receiving instructions from a central similar microcontroller that plays the role of the supervisor, over standard industrial networking communication protocols such as CAN 2b. The resulting micro-controller network has the possibility to run the individual control loop for every individual actuator, including the hybrid force-position control, with a frequency higher than 1000 Hz. The central supervising micro-controller can broadcast instructions to each individual micro-controller with a frequency higher than 50 Hz, including the variation of the control loop gains as presented above.

Based on the above, the following method is proposed in the context of the satellite docking procedure proposed in the present patent:

For approaching the telescopic arm and pincher towards the target client surface, the position gain, integral P gain and Derivative P gain are two orders of magnitude higher than the force gain, Integral F gain and Derivative F gain, providing a feedback loop that favours position versus force control. During this mode of operation, the position control loop is favoured against the force control loop, as the importance of precisely positioning the telescopic means holding the end effector is critical.

Upon detection of the measurement of a force within one of the axis of the parallel manipulator exceeding a pre-specified force threshold, the variable gains are all switched to increase the Force gains of the loop, providing roughly equal gains for force and position control. In the event that in one of the micro-controllers supervising the operation of a single actuator, a force is detected that exceeds a pre-set limit, indicating that a contact has been detected between the body of the telescopic means or the end effector pincher itself, with some surface of the target spacecraft, the supervising controller switches all the variable gains of all the individual micro-controllers that operate each linear actuator to a mode that uses higher force gains, therefore increasing the compliance of the docking system against possible contacts with the surfaces of the client. This action may result in a possible altering of the effective linear position output of the actuators and may result at the positioning of the SP at a location that differs from the reference position instructed from the supervisor controller. This effect represents the compliant behaviour of the SP in the event of an accidental contact during the course of the docking operation. This feature represents a safety factor guaranteeing that no high forces may develop during the docking process that may damage either structural parts of the client spacecraft or the docking system itself.

Upon the achievement of a grasp of the target protruding element of the client by the pincher such as the LAR, the variable gains are again all switched to increase the Force gains of the loop, providing force gains that are one order of magnitude higher than the position control gains, providing a feedback loop that favours force versus position control. Immediately after the closing of the pincher is achieved, with the proximity sensors validating the actual capturing of an element of the client spacecraft (in this case the LAR section), the aforementioned gains of the control loops of the individual actuators are again switched to a mode favouring higher force compliance and less position control, by increasing the gains related to force by an order of magnitude relative to the gains related to position. This needs to be done in order to attenuate possible relative rates existing between the two spacecrafts at the moment of contact. It may also be needed if the client spacecraft is in tumbling condition during the moment of capturing.

It must be noted that under the mode favouring force compliance, the position control of the SP will not achieve correct positioning of the end effector pincher, due to the compliance effect. This high compliance mode will only be maintained during the stabilization process of the client, aiming at the full elimination of all relative rates between the two vessels. The time period needed for the complete elimination of the relative rates will depend on the mass of the client and the kinetic energy of the stack that needs to be dissipated. The expected way of dissipating the energy is through the use of reaction wheel unloading of the servicer (using the dedicated thrusters for reaction wheel unloading) as well as through dissipation on the power control cards of the actuators operating the SP. Once this energy is dissipated and the stack is stabilised, the control mode should return the gains to position control, in order to operate the retraction of the telescopic means and the approach of the SP towards the target surface captured by the pincher 11. This operation is completed when the telescopic means is fully collapsed, as shown on FIG. 7b, and the Servicer is approached to the target LAR as shown on FIG. 7d. The collapse of the telescopic means brings the clamps 43 at the proximity of the LAR, as shown on FIG. 7e. The SP is positioned in a way that the proximity sensors 44 as shown on FIG. 8 placed at the center of each clamp measure distances not exceeding 1-2 cm from the target LAR. Under these conditions the linear actuator 47 of the clamp is activated and closes the arms 45 and 46 around the LAR section, fully securing the clamp on the target LAR as shown on FIGS. 9a and 9b. After fully securing the LAR with the clamps, the SP end effector plate 37 is set to nominal position by the control system, activating all the linear actuators of the SP towards their nominal fully retracted positions, a fact which results to the possible rotation of the overall chaser spacecraft relative to the client vessel as shown indicatively on FIG. 9c. The return of the SP actuators in their fully retracted positions also results to the insertion of the base 32 of the telescopic means shown on FIG. 9d to be inserted in the specially designed receptacle 48 of the base 36 of the SP shown in FIG. 9e, where it forms a rigid force and torque transmission structure between the forces generated on the clamps 43 and transmitted through the end-effector plate of the SP 37 towards the base of the SP 32 as shown on FIG. 9f. This rigid force and torque transmission structure is very important to be created, in order to relieve the linear actuators of the SP as well as the force sensors placed on the end effector plate 37 from the task of transmitting forces and torques between the plates 37 and 36, during possible thruster burns for de-orbiting or station keeping operations of the stack and in order to achieve maximum stack rigidity for the precision of station keeping and de-orbiting operations. The rigid force and torque transmission structure formed in the described way, is further preloaded by the operation of the linear actuators 35 in full retraction, which are driven to compress the telescopic means and its base 32 into the receptacle 48 and rigidify the assembly. After this operation is completed, the servicer is found in a position shown on FIG. 10, with a relative rotation angle vis-a-vis the client which is shown in the FIG. 10 exaggerated, but in reality it depends on the exact location of the grasping point on the LAR by the pincher and the subsequent locking of the clamps. As the exact location of the said grasping point on the LAR cannot be a—priori known, the docking system and method presented in the proposed invention has to take into account this relative angle for the correct alignment of the station-keeping mini-thrusters 7 and the possible de-orbiting thrusters of the stack. After the said locking of the telescopic means, as well as the SP locking and servicer positioning, the 2 additional stabilising arms 49 are prepared for deployment (shown retracted on FIG. 10). These are single degree of freedom light arms, deployed by rotation around the hinge 50 of the servicer, which is placed rigidly on the chassis of the servicer as shown on FIG. 10a. A small rotary electric actuator 51 performs the deployment of arm 49 (FIG. 10a). The dimension of each arm 49 must be tailored to the dimension of the LAR of the client vessel. Due to the fully deterministic geometry of the clamps and the rigidified SP, as well as the known dimensions of the servicer, the location of the hinges 50 for the deployment of the 2 arms (as shown on FIG. 10a) can be easily a priori determined, in a way to achieve contact with the target LAR in pre-defined locations relative to the location of the initial pincher and SP mounted clamps, that are roughly equally spaced from the primary clamping location of the SP and also equally distanced between each, forming in that way 3 locking points on the LAR that represent the 3 tops of an equilateral triangle. In FIG. 10a the additional deployed arm is shown in more detail, with clamp 52 attached on the LAR periphery. FIG. 11a shows both these arms 49 deployed. A detail of the clamp geometry is shown on FIG. 11b, showing the clamp having arrived on the LAR periphery, where a proximity sensor 53 detects the proximity of the clamp to the LAR and the operation of a linear actuator 54 can be initiated. The linear actuator is held by hinge 55 and operates on the hinge 56, which acts upon the lever 58 as well as lever 57, producing the closure of the clamp as shown on FIG. 11c. The side view of the clamp with the detail of the closing mechanism can be seen on FIG. 11d. As previously stated, the specific design of the clamp has to be adapted on the LAR section of the specific target satellite but in general the design can adopt a mechanism of this type for securing the LAR. FIG. 12a shows the two vessels connected through the proposed system from the back of the servicer satellite. FIG. 12b shows an overview of the stack, with the auxiliary arms 7 holding the station keeping thrusters in position. These auxiliary arms need to provide the possibility to modify the direction of the vector of the thrusters 59, in a way to guarantee that the resulting force generated by the thrusters generate the required resulting forces for the needs of stack station—keeping or stack de-orbiting. FIG. 12c shows a side view of the stack where the 3 connecting elements of the two vessels are seen. FIG. 12d shows a plan view of the stack, where the servicer 1 can be seen docked on the client 2, also showing the solar panels of the servicer 60, that are seen not being obscured by the solar panels of the client. This fact is also confirmed by FIG. 12e, where the stack is shown with the servicer behind the client, with the solar panels 60 of the servicer clearly shown not being obstructed by the panels of the client, while the K-band antenna of the servicer 61 can also be seen not obstructed by the antennas of the client. In general, it can be seen that there is an arc of roughly 45 degrees on the LAR where the pincher may grasp with the solar panels of the servicer and the K bank antenna still able to remain unobstructed post docking. The proposed method for approaching and docking on the LAR of the client takes into account this target angle area.

The invention claimed is:

1. A docking structure configured to be connected to a servicer spacecraft and configured for a purpose of approaching a client spacecraft and connecting the client spacecraft to the servicer spacecraft, the docking structure comprising:
    a parallel manipulator composed of six linear actuators, with its base being securable to a servicer chassis and its end effector plate characterized by the fact of holding a retractable and extendable telescopic rod means, said telescopic rod means carrying a capturing pincher, there being at least one motorized digit on the pincher that is operable to secure a protruding element of the client spacecraft,
    at least one single-degree-of-freedom motorized clamp, mounted on the end-effector plate of said parallel manipulator, the at least one motorized clamp is configured to clamp onto the protruding element of the client spacecraft once said telescopic rod means is retracted and said end-effector plate is brought at a vicinity of said protruding element,
    at least two additional motorized arms of a single degree of freedom each, the additional motorized arms are at least one of extendable and pivotable, and the additional motorized arms are moveable to reach the client spacecraft, each of the additional motorized arms has a free extremity having one one-degree-of-freedom clamping device that is configured to capture the protruding element of the client spacecraft, capturing positions of said additional motorized arms are roughly equally spaced with respect to a capturing position of said motorized clamp, such that the three capturing positions of the additional motorized arms and the motorized clamp of the servicer spacecraft roughly form an equilateral triangle.

2. The docking structure according to claim 1, where said capturing pincher with at least one digit can operate closure of said digit through the use of a mechanically triggered, spring-based, fast-closing mechanism that facilitates a response time for the pincher to close in less than one second, based on a slow-rotating, small, spring re-coiling electric motor and gearbox, operating the spring re-coiling and "opening" of the digit forming the pincher, said mechanism prohibits said digit to be forced to open again after closure, by means of a single rotation-sense mechanical limiter comprising free needle-rollers, a quick release trigger can be initiated by rotation of said electric motor and said gearbox to a specific angular position, in which position the trigger disengages the digit from the motor and releases the digit free to "close" the pincher, acting upon the effect of forces developed in said coiled spring, said mechanism being configured to re-open the pincher after fast closure, through the operation of the slow-operating, small electric motor and gearbox at reverse mode at first and then in spring re-coiling mode, for return of the pincher in full open position.

3. The docking structure according to claim 2, where said capturing pincher is equipped with a plurality of optical proximity sensors that are configured to provide information on a distance of the pincher to a target surface, both along an axis of extension of the telescopic rod means as well as along an axis orthogonal to a direction of extension of the telescopic rod means and containing an operational plane of the pincher, said proximity sensors being configured to measure distances from the target surface of a few cm up to several cm, the measured distances facilitating a capturing process to capture targeted protruding elements of the client spacecraft by the pincher, which is based on determining the distances of the targeted protruding elements near the pincher, both along the telescopic extension axis of the pincher, as well as along the axis orthogonal to the telescopic extension axis, that are contained within the operational plane of the pincher, therefore evaluating if the pincher can capture the targeted protruding elements when the pincher is in a proximity of the targeted protruding elements.

4. The docking structure as described in claim 1, where the end-effector plate of said parallel manipulator is equipped with load sensors at the mounting location of each linear actuator, enabling measurement of force developed or the force applied in each specific actuator, or alternatively the actuator itself comprising a force sensor element within its structure enabling the measurement of the force developed or applied on the specific actuator, permitting the application of a selective compliance hybrid (force-position) control mode on said parallel manipulator.

5. The docking structure according to claim 4, where said telescopic rod means, upon full retraction thereof, is positioned and mechanically secured at the base of said parallel manipulator, in such a way that loads transmitted on the at least one motorized clamp that is mounted on the end-effector plate of the parallel manipulator and are transmitted to said end-effector plate of said parallel manipulator, do not exercise any forces on the linear actuators of said parallel manipulator, but any such forces developed on said end effector plate of the parallel manipulator are directly transmitted to the base of said parallel manipulator and, from there, to the servicer chassis, via the retracted locked telescopic rod means that is positioned within a receptacle on the base of said parallel manipulator, therefore, after full retraction, the telescopic rod means relieves the linear actuators of said parallel manipulator from any force handling and force transmitting task.

* * * * *